United States Patent
Crafts et al.

(10) Patent No.: US 6,801,969 B2
(45) Date of Patent: Oct. 5, 2004

(54) METHOD AND APPARATUS FOR DATA DEPENDENT, DUAL LEVEL OUTPUT DRIVER

(75) Inventors: Harold S. Crafts, Colorado Springs, CO (US); John B. Lohmeyer, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/144,462

(22) Filed: Jul. 31, 2002

(65) Prior Publication Data

US 2003/0046598 A1 Mar. 6, 2003

Related U.S. Application Data

(62) Division of application No. 09/322,328, filed on May 25, 1999, now Pat. No. 6,557,066.

(51) Int. Cl.[7] .............................................. G06F 13/00
(52) U.S. Cl. ......................... 710/100; 710/305; 326/30; 327/156; 713/503
(58) Field of Search .................. 710/58, 305, 100; 713/401, 500, 501, 502, 503; 326/26, 27, 30–33, 37, 38, 90; 327/158, 108, 379, 292, 382, 156

(56) References Cited

U.S. PATENT DOCUMENTS

| | | | |
|---|---|---|---|
| 4,914,317 A | 4/1990 | Agiman ...................... 307/270 |
| 5,231,319 A | 7/1993 | Crafts et al. ................. 307/603 |
| 5,455,522 A | 10/1995 | Jones .......................... 326/27 |
| 5,467,464 A | 11/1995 | Oprescu et al. ............. 395/550 |
| 5,535,337 A | 7/1996 | Hogan et al. .......... 395/200.19 |
| 5,656,952 A | 8/1997 | McCall et al. ................ 326/82 |
| 5,751,978 A | 5/1998 | Tipple ......................... 395/309 |
| 5,852,579 A | 12/1998 | Arcoleo et al. ........ 365/189.05 |
| 5,874,833 A | 2/1999 | Perry et al. .................... 326/26 |
| 5,912,567 A | 6/1999 | Drost et al. ................... 327/89 |
| 5,920,533 A | 7/1999 | Honma ......................... 369/59 |
| 5,953,521 A | 9/1999 | Dabral et al. ............... 395/552 |
| 6,002,268 A | 12/1999 | Sasaki et al. ................. 326/41 |
| 6,072,729 A | 6/2000 | Casper .................. 365/189.05 |
| 6,092,212 A | 7/2000 | Muljono et al. ............ 713/600 |
| 6,163,178 A | 12/2000 | Stark et al. ................. 327/108 |
| 6,172,541 B1 | 1/2001 | Young et al. ............... 327/170 |
| 6,222,388 B1 | 4/2001 | Bridgewater, Jr. ........... 326/86 |
| 6,438,636 B2 * | 8/2002 | Muljono ..................... 710/300 |
| 6,557,066 B1 * | 4/2003 | Crafts et al. ................ 710/305 |

FOREIGN PATENT DOCUMENTS

| | | | | |
|---|---|---|---|---|
| DE | 3508745 A | * | 9/1986 | .......... H03H/11/20 |
| EP | 0 575 676 A1 | | 12/1993 | .......... H03K/19/00 |
| JP | 10198473 A | * | 7/1998 | ............. G06F/3/00 |

* cited by examiner

*Primary Examiner*—Xuan M. Thai
(74) *Attorney, Agent, or Firm*—Yee & Associates, P.C.

(57) ABSTRACT

The inter-symbol interference problem is reduced by detecting a data sequence indicating when a boost is needed on a 'short pulse', usually the first data pulse of the opposite polarity after a string of data pulses of the same value. A data decoder that detects when current compensation is required and an output driver that has the variable drive capability to change the drive current on the short pulse is used to boost the amplitude. The output driver is regulated by a phase locked loop which includes a voltage variable delay digitally controlled voltage variable reference capacitors in the phase locked loop circuit for receiving data from memory that contains the proper capacitor control voltage needed. The time required to charge the capacitor is constant and the delay is slaved to the clock period.

25 Claims, 17 Drawing Sheets

METHOD AND APPARATUS FOR DATA DEPENDENT, DUAL LEVEL OUTPUT DRIVER

CROSS-REFERENCE TO RELATED APPLICATIONS

This application is a divisional of application Ser. No. 09/322,328, filed May 25, 1999 now U.S. Pat. No. 6,557,066.

The present application is related to application Serial Number (Attorney Docket Number 98-215), filed (concurrently herewith), titled "Method and Apparatus for Self Correcting Parallel I/O Circuitry," hereby incorporated by reference, and application Serial Number (Attorney Docket Number AT98-216), filed (concurrently herewith), titled "Method and Apparatus for Self Correcting Skew Reduction and Variable Delay Elements for Self Correcting Parallel I/O Circuitry," hereby incorporated by reference, and application Serial Number (Attorney Docket Number 98-249), filed (concurrently herewith), titled "Method and Apparatus for On-Chip Termination for Bus," hereby incorporated by reference.

BACKGROUND OF THE INVENTION

1. Technical Field

The present invention relates generally to an improved data processing system and in particular to a method and apparatus for transferring data signals between devices connected to a bus. Still more particularly, the present invention relates to a method and apparatus for reducing problems associated with the skew when transferring data between devices connected to a bus.

2. Description of the Related Art

Data processing systems, such as work stations, servers, and personal computers, are being used in many aspects of business and personal life. The users of these systems demand and expect high-speed performance from these computers. Many components of the data processing system have been increased in speed to increase performance. For example, processor speeds have been rapidly increasing. In addition, the bus used to interconnect various components within a computer system and transfer signals between them has been another component in which speed has been increased. A bus is commonly employed to interconnect modules of a computer system and transfer signals between them to carry out desired operations within the computer system. In addition, the bus is a key element whose characteristics, such as speed, has a major impact on the overall performance of the computer system. The high-speed performance of interface busses, such as Ultra3 SCSI, which is currently under development, increase with improvements in technology. A difficult design task is to assure that multiple signals on parallel communication media have consistent timing, given factors indicating minute but significant differences in the details of packaging construction, socket and connection variation, PC board variation and variations in the SCSI bus itself.

One problem with increasing speeds in busses, such as SCSI buses, is skew. Skew is the differences between the propagation delays of two or more signals passing through multiple paths in a device or along a set of parallel signal lines. For proper operation of the computer system, clock signals should arrive at the interface circuitry at the same time; otherwise, reliable data transmission is not ensured. For example, if a module receiving data is "clocked" later than others, the earlier clocked modules may overwhelm the data before it is stored at its proper destination. The lack of simultaneity in reception of the clock signals relative data signals at the modules, i.e., clock skew, directly increases the amount of time that the data must remain stable on the bus; this, in turn, increases the time required for each data transfer on the bus and, thus reduces the speed of the bus.

The amount of clock skew introduced into a computer system may be caused by the variations in propagation delays among clock receiver chips of the system. In digital logic applications using transistors, a transistor switches "on", when saturated, and "off", when non-conducting, to generate full swings between power supply voltages. The resulting output voltage "signals" represent corresponding high and low states. Propagation delay, which affects the switching speed of the transistor, is highly dependent upon variations in the fabrication process of the chip. In addition, the applied voltage, the operating temperature environment and the loading conditions of the chip affect its performance.

Cooperating sequential logic circuits that each perform several routine operations and that are each controlled by derivatives of a common clock signal are present in data processing systems. The clock signals must be synchronized at locations within the system if the system is to function optimally. Although the individual clock signals may have a common source, they often do not arrive at their intended destination in proper synchronism, due to variations in signal propagation delay for each destination. Thus, combining several complex sequential logic circuits within a system presents a challenge with respect to synchronizing the time frames of each of the circuits with each other.

As integration levels of microelectronic circuits and system complexity continues to increase, the routing or distribution of a master system clock becomes more critical. This problem is exacerbated in view of ever increasing clock rates. Thus, clock distribution in a complex integrated circuit requires careful selection of routing scheme, including such considerations as distribution topography across the circuit, propagation delays in routing the clock signal to all elements on the circuit, desired set up and hold times and variations in system design parameters, such as system clock rate, that can affect circuit operation.

Because synchronous sequential logic circuits change states only at the rising or falling edge of a synchronous clock signal, proper circuit operation requires that any external input signals to the synchronous sequential logic circuit must occur with the proper set up time and hold time requirements relative to the designated clock edge. The set up time is the period of time during which a system or component is being prepared for a specific operation. To satisfy a set up time, the data is required to be settled by a predetermined time before the clock edge. The predetermined time is called the "set up" time. The "hold time" is the predetermined time that the data is required to be held after the clock edge. The predetermined time is called the hold time. However, in a system comprised of a sequential logic circuit having a master system clock that operates the several diverse system circuits, a problem exists with skew between the system clock and the destination clock signals propagated through the various circuits. Such a problem is especially evident with bus systems, such as a SCSI bus with various adapters or components using the SCSI bus to transfer data.

Thus, it would be advantageous to have an improved method and apparatus for reducing skew in a system containing devices connected to a bus in which data is sent between the devices.

Another problem with the conventional bus configuration is matching the correct terminating impedance to the bus lines. While the proper termination can be determined for a specific bus after some testing, the impedance of the terminators changes with temperature because the resistors used are not temperature stable. As the bus temperature, and hence the temperature of the terminating resistors change, so does the impedance. Bus termination becomes more crucial for a bus when the number of peripherals increase and in cases when clock skew introduced into a computer system by the variations in propagation delays among clock receiver chips of the system is near the operating tolerance of the bus.

Thus, it would be advantageous to have an improved method and apparatus for stabilizing the impedance of resistors in a bus termination.

Another problem associated with transmitting data is the inter-symbol interference (ISI) problem associated with high speed parallel bus configurations such as the parallel SCSI bus. The ISI problem which results from excess capacitance of the SCSI bus, which becomes worse as the number of peripherals attached to the bus increases. The bus requires charging after being discharged with a series of ones or zeros. A "short pulse" occurs immediately subsequent to a series of three or more consecutive ones or zeros.

Thus, it would be advantageous to have an improved method and apparatus for recognizing when the current driver needs an extra boost to increase the amplitude of a short pulse.

SUMMARY OF THE INVENTION

The present invention discloses a method and apparatus for using a variable delay for reducing the skew on a bus, stabilizing bus terminating impedance and reducing inter-symbol interference. A training program trains the host transmitter for optimal skew compensation at a target receiver by identifying an optimal delay value determined by the operational data window. For each bus line, the host sends out a plurality of data patterns, each at a slightly different timing delay, which are returned or echoed back from the target device. The operational data window is defined on each line by the delay timings at which valid data patterns are returned from the target. Once the operational data window has been defined for each line, an optimal delay value, usually the mid-delay in the operational window, for the clock may be retained as a way of shifting the skew of the clock on all data lines at the same time. That delay value may be stored in a memory and converted to a control voltage for controlling a digitally controlled voltage variable delay to adjust the delay for data in a bus. A phase locked loop is employed to ensure that variations due to voltage, temperature, and processing are minimized. The output of a phase locked loop is used for controlling the impedance in a bus terminator. The bus terminator includes voltage variable resistors which are controlled by the control voltage from the phase locked loop. The control system for the terminator includes a voltage variable delay digitally controlled voltage variable reference capacitors in the phase locked loop circuit for receiving data from memory that contains the proper capacitor control voltage needed. The time required to charge the capacitor is constant and the delay is slaved to the clock period. The inter-symbol interference problem is reduced be detecting a data sequence indicating when a boost is needed on a 'short pulse', usually the first data pulse of the opposite polarity after a string of data pulses of the same value. A data decoder that detects when current compensation is required and an output driver that has the variable drive capability to change the drive current on the short pulse is used to boost the amplitude.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
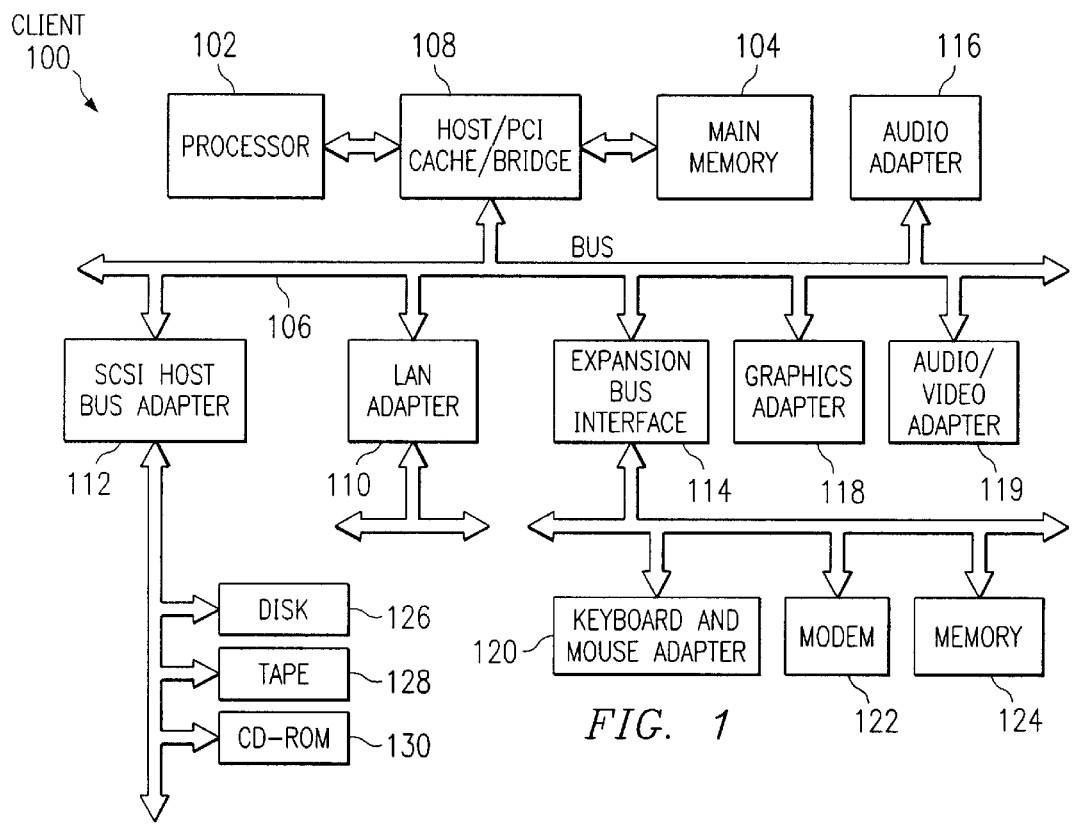
FIG. 1 is a block diagram, which illustrates a data processing system in which the present invention may be implemented.

With reference now to FIG. 1, a block diagram illustrates a data processing system in which the present invention may be implemented. Data processing system 100 is an example of a client computer. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

As another example, data processing system 100 may be a stand-alone system configured to be bootable without relying on some type of network communication interface. As a further example, data processing system 100 may be a Personal Digital Assistant (PDA) device which is configured with ROM and/or flash ROM in order to provide non-volatile memory for storing operating system files and/or user-generated data. The depicted example in FIG. 1 and below-described examples are not meant to imply architectural limitations.

Figure 2:
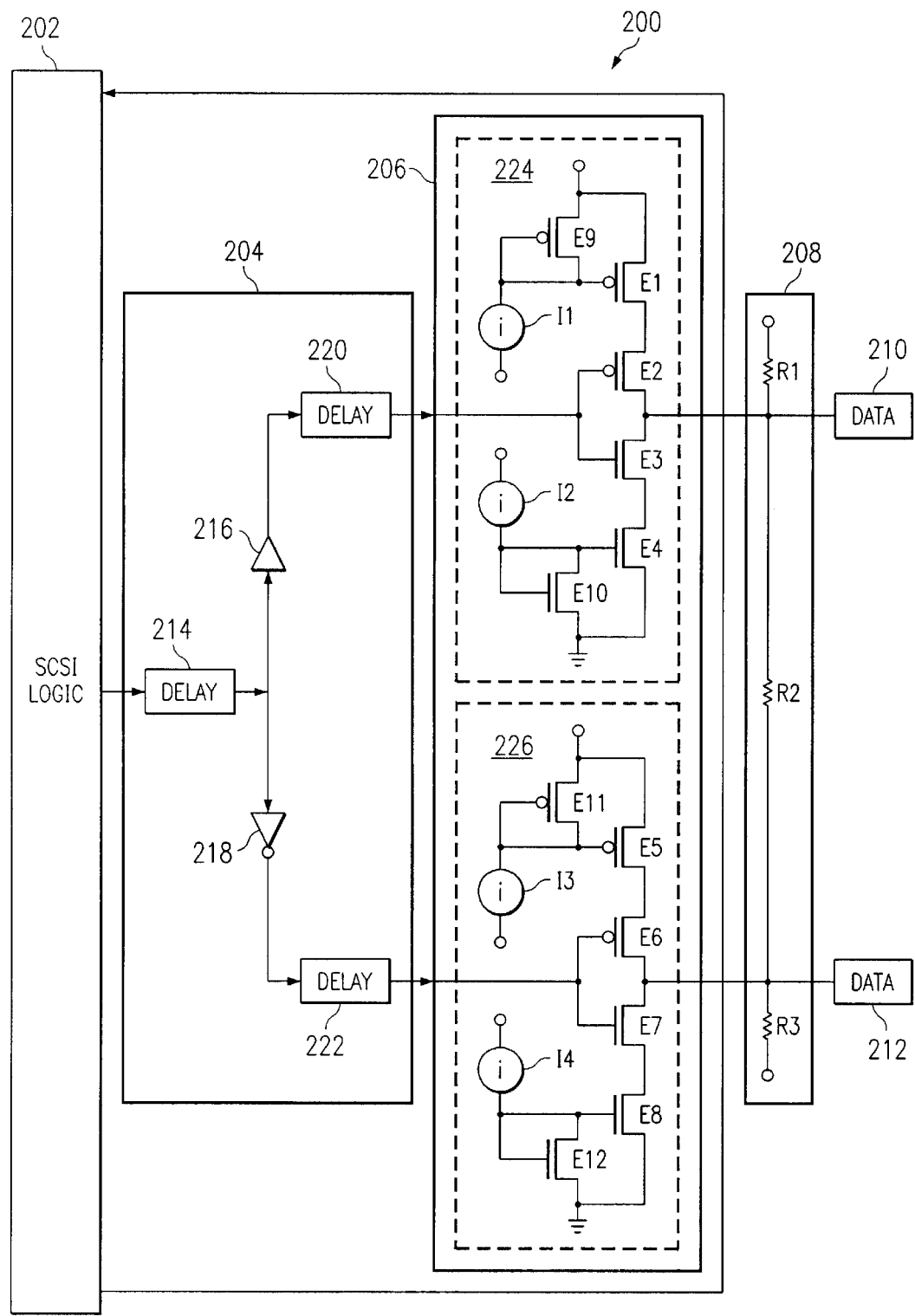
FIG. 2 is a block diagram of an adapter in accordance with a preferred embodiment of the present invention.

Turning next to FIG. 2, a block diagram of an adapter is depicted in accordance with a preferred embodiment of the present invention. Adapter 200 is a low voltage differential (LVD) SCSI adapter, such as SCSI host bus adapter 112 in FIG. 1. Adapter 200 includes logic 202, which is connected to delay unit 204. A driver unit 206 is connected to delay unit 204 and also has a connection to termination unit 208. Driver unit 206 provides a connection to data pads 210 and 212.

In the depicted example, delay unit 204 includes a skew compensation unit 214, which receives data from SCSI logic 202. Skew compensation unit 214 has an output connected to the inputs of buffer 216 and inverter 218. Buffer 216 has its output connected to differential compensation delay unit 220 while inverter 218 has its output connected to differential compensation delay unit 222. The output from these two differential compensation delay units are sent to driver 224 and driver 226 within driver unit 206. Driver 224 includes transistors E1–E4 with transistors E1 and E2 being p-channel metal oxide semiconductor (PMOS) transistors, while transistors E3 and E4 are n-channel metal oxide semiconductor (NMOS) transistors. The gates of transistors E2 and E3 are connected to the output of differential compensation delay unit 220 in delay unit 204. The gates of transistors E1 and E4 are controlled by current sources I1 and I2. Transistors E9 and E10 provide a connection to the gates of transistors E1 and E4 in this example. Transistor E9 and transistor E10 are diode connected transistors in this example with transistor E9 being a PMOS transistor and transistor E10 being a NMOS. This driver unit is powered by connecting a source of transistor E1 to upper power supply voltage $V_{dd}$ while the source of transistor E4 is connected to a lower power supply voltage $V_{ss}$. Driver 226 includes transistors E5–E8 with transistors E5 and E6 being PMOS transistors and transistors E7 and E8 being NMOS transistors. Driver 226 is powered by connecting a source of transistor E5 to an upper power supply voltage $V_{dd}$ while connecting a source of transistor E8 to a lower power supply voltage $V_{ss}$. Additionally, Current sources I3 and I4 are connected to the gates of transistors E5 and E8. Transistors E11 and E12 are configured in a diode configuration with transistor E11 being a PMOS transistor and transistor E12 being a NMOS transistor. The gates of transistors E6 and E7 are connected to the output of differential compensation delay 222. The output of driver 224 is connected to variable resistors R1 and R2. The output of driver 226 is connected to variable resistors R2 and R3.

The present invention provides a method, apparatus, instructions, and mechanism for minimizing the effects of skew I/O data processing system. Timing delay circuitry may be connected to each of the I/O devices on a SCSI bus. A signal is generated and the response of the I/O connection is measured. Information on the relative delay of each output is timed through a measurement and the necessary on chip changes is calculated. Appropriate circuitry, such as a voltage controlled delay element, can be used to correct individual differences in I/O paths to minimize excess skew of signals. Circuitry may be attached to the I/O devices by means of non-volatile, programmable, memory devices if reprogramming at each power up is not desired. The voltage variable delay is placed in a synchronizing feedback loop to remove delay variations caused by supply voltage, temperature, and processing variations. The system clock in the data processing system is employed to provide timing control for this loop. Since the voltage variable delay element is unidirectional and the SCSI bus is bi-directional, separate delays may be used for the inputs to the SCSI controller and for the outputs to the SCSI controller. Depending on the implementation, an assumption may be made that the input and the output delays are the same. Alternatively, separate measurements may be made to determine the delay in each direction.

Figure 3:
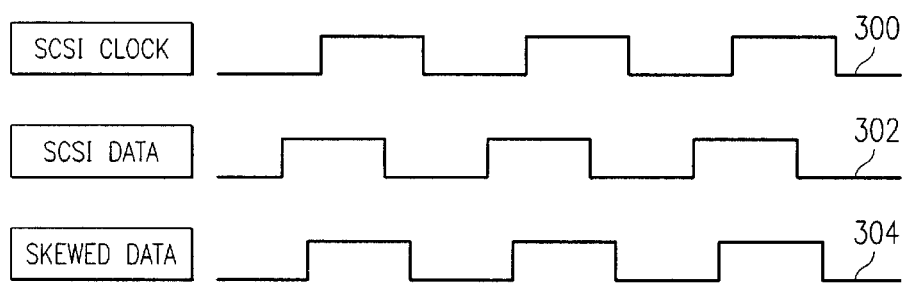
FIG. 3 is a set of waveforms illustrating data transitions on both edges of a clock in a SCSI bus in accordance with a preferred embodiment of the present invention.

With reference now to FIG. 3, a set of waveforms illustrating data transitions on both edges of a clock in a SCSI bus, such as Ultra 3 SCSI, is depicted in accordance with a preferred embodiment of the present invention. In this example, waveform 300 is the system clock also referred to as the SCSI clock. Waveform 302 is the data on the SCSI bus, while waveform 304 represents the skewed data. This data may be de-skewed by adding a fixed delay to the clock in waveform 300 and a digitally controlled delay to the data in waveform 304. This type of delay will allow data transitions to be optimally aligned between clock edges, providing maximum skew budget for the SCSI bus. Through the use of a phase locked loop, these delays may be made independent of voltage, temperature, and process variations. The delays will be controlled only by the system clock.

Figure 4A:
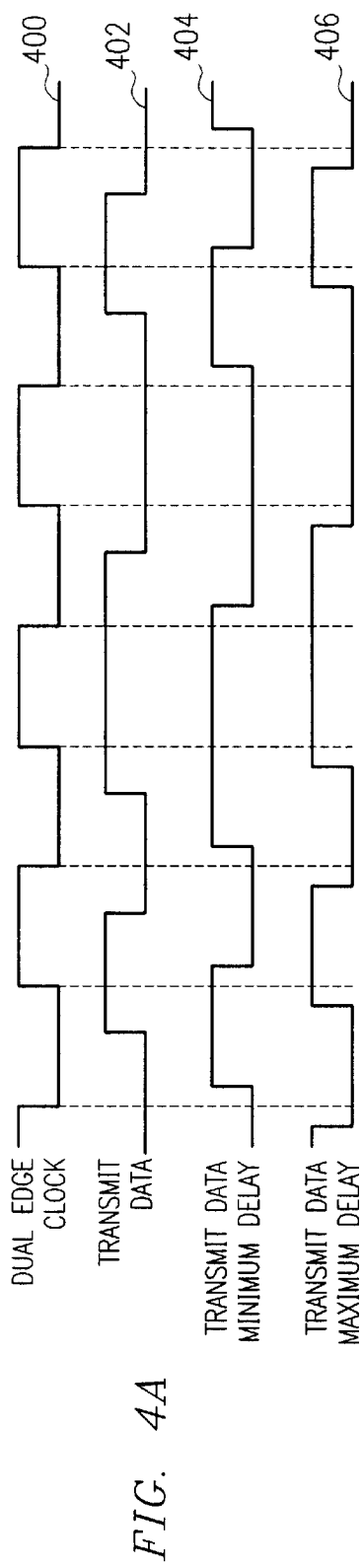
FIG. 4A are timing diagrams illustrating skew problems in accordance with a preferred embodiment of the present invention.

With reference now to FIG. 4A, timing diagrams illustrating skew problems are depicted in accordance with a preferred embodiment of the present invention. FIG. 4 represents logical 'ones' and 'zeros' rather than a representation of voltage timings. Waveforms 400, 402, 404, and 406 illustrate the possible variation in transmit timing delay of transmitted data to a target device. Waveform 400 is that of a dual edge clock, such as that used in Ultra 3 SCSI. The data is transmitted or clocked based on the rising and falling edges of waveform 400. Waveform 402 illustrates data transmitted by a host node. In this example, the clock is lined up in the middle of the transmit data waveform, for illustration purposes only. However in actuality the clock may fall outside the switch points on transmit data waveform 402 and thus requiring more delay than shown in minimum delay waveform 404 and transmit data maximum delay waveform 406. In this example, the transmit data sequential data is in the form of "010110010". Waveform 404 illustrates the transmit data minimum delay which can be adjusted, while maintaining the transmit data in the operational window of the bus, using a preferred embodiment of the present invention. Waveform 406 illustrates the transmit data maximum delay which can be adjusted, while maintaining the transmit data in the operational window. Therefore as can be seen in FIG. 4A, the timing delay adjustment range of the present invention allows for significant delay adjustments in order to align the clock with the center of the switch points of the transmit data waveform.

Figure 4B:
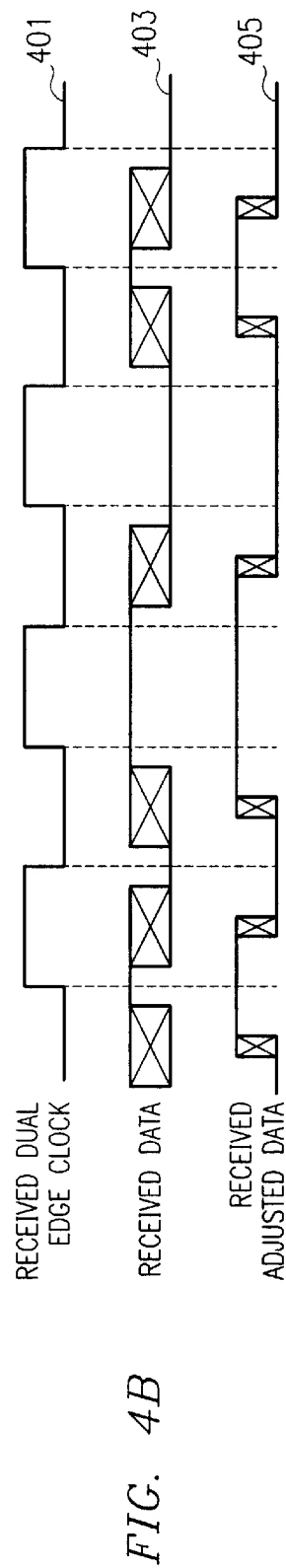
FIG. 4B are timing diagrams illustrating skew reduction depicted in accordance with a preferred embodiment of the present invention.

Turning next to FIG. 4B, timing diagrams illustrating skew reduction are depicted in accordance with a preferred embodiment of the present invention. Waveforms 401, 403 and 405 illustrate the reduction in transition uncertainties using the processes of the present invention. Waveform 401 is a received dual edge clock. Waveform 403 shows the large area of uncertainty, depicted by the crossed boxes on the waveform, exhibited by not controlling the timing delay. Note that even though the clock has been lined up to the middle of the data waveform, the switch points on received data waveform 403 fall dangerously close to the clock edges of waveform 401. Had the clock not been aligned with the midpoint of waveform 403, the clock could have easily fallen outside the switch points of the waveform, resulting in received data errors. However, by adjusting the timing delay by an appropriate value, the area of uncertainty is greatly reduced, as can be seen from the reduction in the size of the uncertain area representing by the crossed boxes.

Figure 5:
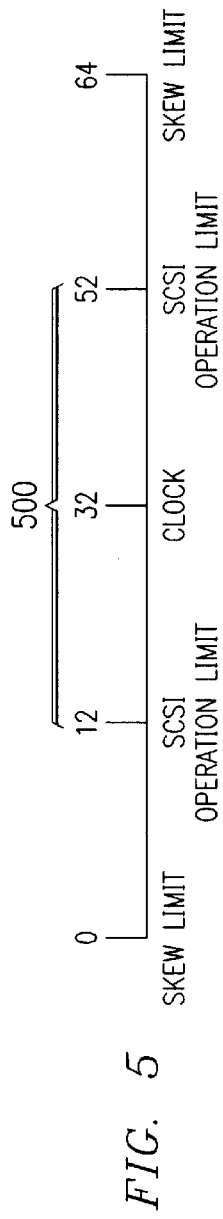
FIG. 5 is a diagram illustrating a process for de-skewing or reducing skew on a bus in accordance with a preferred embodiment of the present invention.

Turning now to FIG. 5, a diagram illustrating a process for de-skewing or reducing skew on a bus is depicted in accordance with a preferred embodiment of the present invention. In the depicted example, the processes illustrated in FIG. 5 may be implemented in a training program that is activated for each of the target devices attached to a SCSI bus. The training program trains the host transmitter for optimal skew compensation at a target receiver. This optimal skew compensation involves identifying a delay, which may be used in the host transmitter. In training the host transmitter, the host or source sends out a data pattern, such as, for example, FF 00. This data pattern is returned or echoed back from the target device, also referred to as the destination. The host or source transmission is sent at fall speed in read buffer mode to the target device, for each of the data lines which echoes the data back asynchronously. The result is a delay value, which is applied to the data signal at the transmitter. This delay value centers the clock in the skew window.

The width of the skew window where the SCSI bus is operable is another piece of information that is useful in analyzing SCSI operations. A very narrow skew window is an indication that the SCSI bus may not operate reliably. This data may be made available to the SCSI bus controller. The bus may be operated at half speed to avoid difficulty with system reliability. The minimum width of the skew window can be determined by using a skew compensation system. If the SCSI bus does not operate reliably at the specified system speed, then the hardware should be examined to determine the cause of the failure to meet specifications.

Once the transmitter delay for the host has been determined, the receiver in the host may be set to the same value because the skews should be nearly identical. Alternatively, receiver skew may be measured by the host receiver and sent back over the SCSI bus to the target device using an asynchronous mode in the depicted example to ensure reliable transmission. The data returned to the target is a data word that was sent from the target on the bus for comparison. The system for determining the skew limits on the host transmitter is essentially the same as the one used to determine the skew for the host receiver. Thus, the same limits should apply to determine if margins are adequate in terms of the width of the skew window.

The mechanisms of the present invention may be used to adjust the clock signal to center the skew window for data signals processed by the host. For example, skew window 500 has one edge at 12 and the other edge at 52, then a delay for the clock signal may be set to thirty-two to center skew window 500 on the clock. In setting the skew window, the clock may be reset to fifteen and the skew window re-measured. Once the skew window is more or less centered in the region between zero and sixty-four, the delay value for the clock may be retained as a way of shifting the relative skew on all data lines at the same time.

The processes for skew control associated with a clock signal may be used to center a skew window for data signals. For example, if one edge of the skew window is a limit of zero and the other edge is thirty-two or less, then the clock could be set to sixteen and the skew window re-measured. Once the data window is more or less centered, the delay value for the clock may be retained as a way of shifting the skew of the clock on all data lines at the same time.

Still referring to FIG. 5, the total delay that can be inserted into any one of the data paths consists of a string of binary weighted delays starting with $2^0$, $2^1$, $2^2$, $2^3$, $2^4$, ending with $2^5$. The actual weighed delays then are 1, 1, 2, 4, 8, 16, and 32 in terms of the unit delay, which in this example is 0.25 nanoseconds. In the case of Ultra3 SCSI, the bus operates at 80 megahertz, so the time between clock events on the SCSI bus is 12.5 nanoseconds. Ideally, the data should switch half way between the clock pulses so the total inserted delay should be a total of somewhat more than the 12.5 nanosecond delay. For the purpose of this example, a total delay of 16 nanoseconds could be used; in which case the unit delay would be 0.25 nanoseconds. In the example in FIG. 5, the total skew between the upper skew limit and the lower skew limit is 16 nanoseconds. The total skew between the lower SCSI operation limit and the upper SCSI operation limit is 10 nanoseconds out of a maximum of 12.5 nanoseconds.

It is to be understood that the example shown in FIG. 5 is for a single data line out of a total of either eight or sixteen depending upon whether the SCSI bus is narrow SCSI or wide SCSI. To determine the SCSI operation limits for the SCSI bus, all the data lines must be measured and the highest value used for the lowest SCSI operation limit for the bus. As a typical example, the skew of the SCSI bus might be assumed to be 4 nanoseconds, in which case the values measured for the lower SCSI operation limit on individual data lines could range from 4 to 20 and the values measured for the upper SCSI operation limit could range from 44 to 60. Using these values in this example, the lower SCSI operation limit for the SCSI bus would be 20 and the upper operation limit for the SCSI bus would be 44. Between these values, all eight or sixteen data lines of the SCSI bus would function normally. The purpose of the training exercise is to determine the values of the delay to be added to the individual data lines, which will make the SCSI operation limits as wide as possible. In the example cited above, if the skew on a single data line makes the lower SCSI operation limit 4 instead of 12, then that same skew will tend to make the upper SCSI operation limit 44 instead of 52. Ideally, the skew should change the limit by the same amount for both end points, however, signal distortion on the bus caused by a number of factors such as bus loading and bus or terminator impedance mismatch can cause the values of the SCSI operation limits to be asymmetrical. In severe cases, these effects may result in more than one SCSI operating region (skew window) for the SCSI bus.

Figure 6:
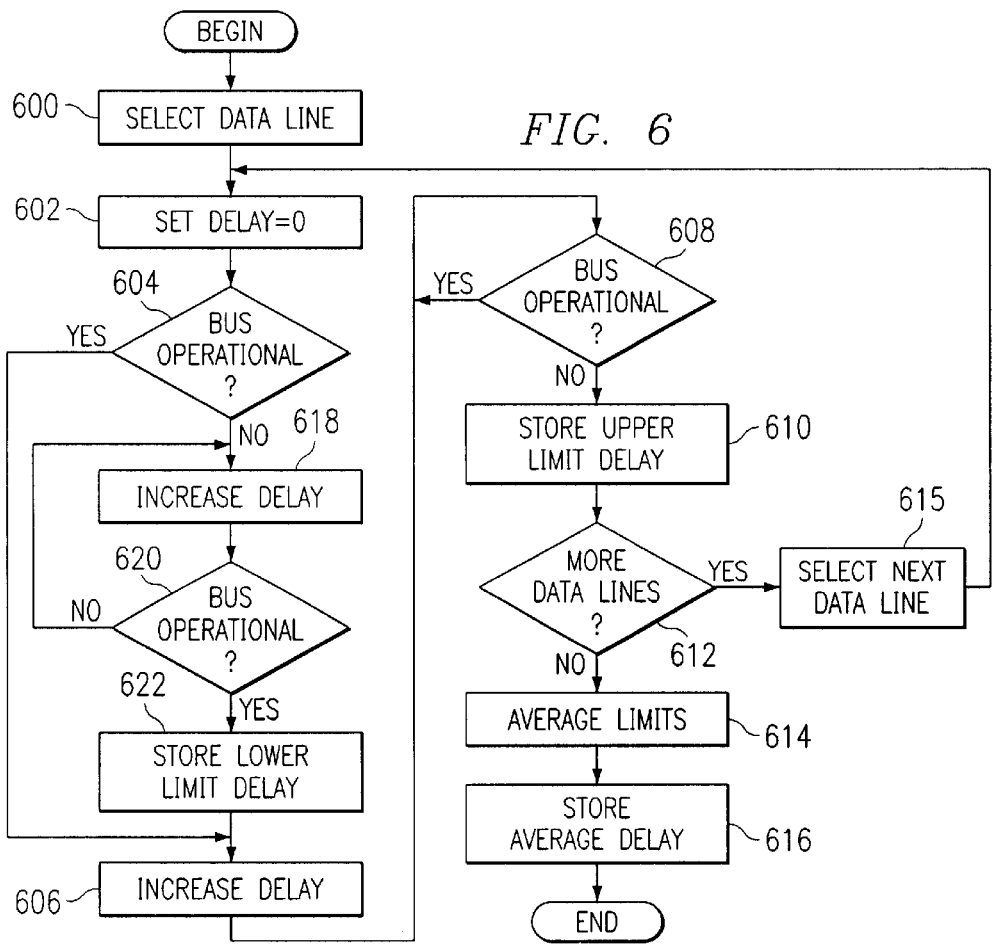
FIG. 6 is a flowchart of a process for identifying and selecting delays for a SCSI bus in accordance with a preferred embodiment of the present invention.

With reference now to FIG. 6, a flowchart of a process for identifying and selecting delays for a SCSI bus is depicted in accordance with a preferred embodiment of the present invention. The process begins by selecting a data line for a particular target device (step 600). The delay is then set equal to zero (step 602). Thereafter, a determination is made as to whether the bus is operational (step 604). This step is used to determine whether the lower limit of operation for the SCSI bus is at zero. If the bus is operational, then the clock delay is increased (step 606). In the depicted example, the clock delay is increased by 10 percent to 20 percent of the delay range. Thereafter, a determination is made as to whether the bus is operational (step 608). This step is used to determine whether the upper operation limit has been reached for the SCSI bus for this particular data line. If the bus is operational, the process returns to step 606. Otherwise, the upper limit has been reached and this limit is stored (step 610). Thereafter, a determination is made as to whether more data lines are present (step 612). If more data lines are present, the next data line is then selected for processing (step 615) with the process then returning to step 602.

Otherwise, a series of operational regions has been determined for each of the data lines for the SCSI bus (step 614). The upper delay value and the lower delay value for a data line is averaged. This particular value is then used to adjust the delay for a particular data line. This averaging is performed for each of the data lines for which delays for upper and lower operation limits have been found. These values are stored for use with the particular data lines (step 616) with the process terminating thereafter.

With reference again to step 604, if the bus is not operational when the delay has been set equal to zero, then the delay is increased one unit delay at a time (step 618). This increase in delay is used to find the lower operation limit of the SCSI bus. A determination is then made as to whether the bus is now operational (step 620). If the bus is not operational, the process returns to step 618 to increase the delay again. This loop is repeated until the bus becomes operational. At that time, a lower limit has been found for the particular data line on the SCSI bus and this delay is stored (step 622). The process then proceeds to step 606 as described above to find the delay for the upper operational limit of the SCSI bus for this particular data line.

Once this process has been performed for a particular target device, the delay values obtained during the process may be used to adjust and reduce skew occurring in the transfer of data between the target device and the host device. This procedure as described in FIG. 6 is repeated for other target devices on the SCSI bus. Each set of values for each target device is saved in the host memory so that the values may be used for the appropriate target device when the host is communicating with the target. For example, a server computer may use the delay values determined by this procedure to communicate with a disk array attached to a SCSI bus.

The present invention provides a de-skewing mechanism that is centered on the host so that the host may operate with target devices that do not contain skew controls. As a result, the present invention avoids compatibility issues with target devices from different manufacturers. In this manner, skew control using this mechanism improves the reliability of a SCSI system.

Figure 7:
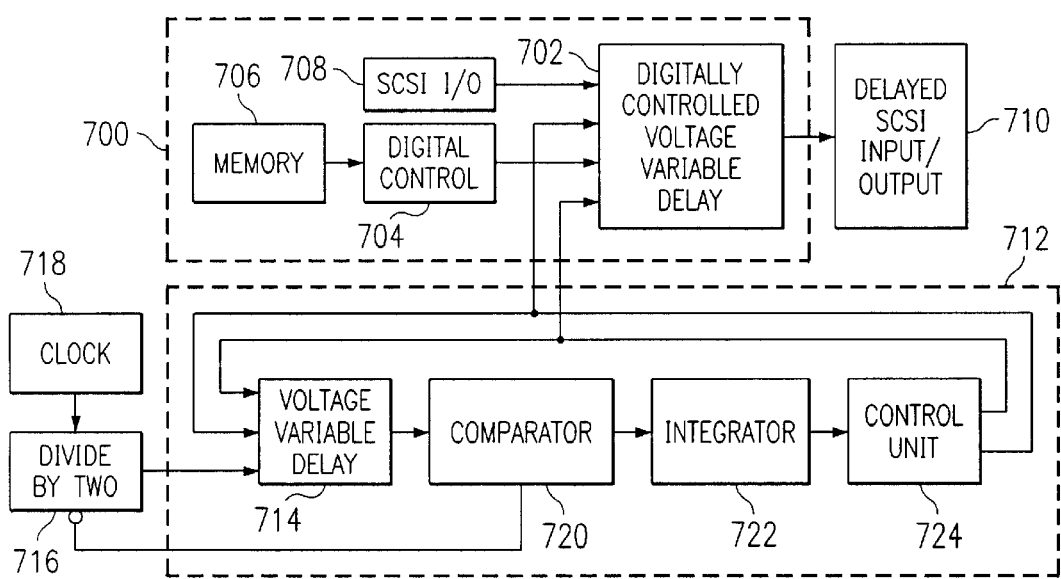
FIG. 7 is a block diagram of a system for controlling a digitally controlled voltage variable delay in accordance with a preferred embodiment of the present invention.

With reference now to FIG. 7, a block diagram of a system for controlling a digitally controlled voltage variable delay is depicted in accordance with a preferred embodiment of the present invention. Control system 712 is used to control digitally controlled voltage variable delay 702, which may be a delay, such as skew compensation 214, differential compensation delay 220, or differential compensation delay 222 in FIG. 2. Digitally controlled voltage variable delay 702 may be adjusted to make corrections for each I/O on the SCSI bus. This delay is controlled by digital control 704, which receives data for controlling digitally controlled voltage variable delay 702 from memory 706. The variation in digitally controlled voltage variable delay 702 is used to adjust the delay for data from SCSI I/O 708 to produce a delayed SCSI I/O 7010. SCSI I/O 708 may originate from the logic in a SCSI adapter. This example is directed towards output from a SCSI device, although the same may be applied to input to a SCSI device. A phase locked loop 712 is employed to ensure that variations due to voltage, temperature, and processing are minimized. In this example, phase locked loop 712 provides this feature through the use of a voltage variable delay 714. In this example, voltage variable delay 714 is an analogue delay element. A divide by two circuit 716 receives a clock signal 718, which is divided to provide a symmetrical clock signal and sent to phase locked loop circuit 712. The clock signal output by divide by two circuit 716 is sent into voltage variable delay 714 in phase locked loop circuit 712. The output of voltage variable delay 714 is compared with the output of divide by two circuit 716 at comparator 720 to generate a logic zero or one depending on the result of the comparison. If too much delay is occurring, then the output in this example is a logic 1, which increases the voltage to reduce the amount of delay. If the amount of delay is too little, then a logic 0 is output from comparator 720 to increase the amount of delay. The output from comparator 720 is processed through integrator 722, which is essentially a low pass filter. The output of integrator 722 is then feed to control unit 724. Control unit 724 essentially outputs an integrator complement signal with the integrator signal, or control voltage, Control_B_Out with Control_Out. Control unit 724 may be incorporated in voltage variable delay 714 or implemented as a separate component for picking off Control_Out and Control_B_Out signals for digitally controlled voltage variable delay 702.

Control unit 724 outputs Control_B_Out and Control_Out are then fed back to voltage variable delay 714 and to digitally controlled voltage variable delay 702. The required delay value is stored in memory 706 with one byte being stored for each target on each SCSI I/O path. The stored delays are used by digital control 704 to drive delay elements within digitally controlled voltage variable delay 702. Each delay element is controlled by phase locked loop circuit 712, so that the delay produced is independent of voltage, temperature, and process. The delay inserted into the data path by the digitally controlled voltage variable delay 702 includes a group of identical delay elements in which the total delay is the sum of the delays of the elements being used. These delay elements are arranged in series with each delay element decreasing by a factor of two in this example.

With reference still to FIG. 7, voltage variable delay 714 in this example is an analogue voltage variable delay. This delay is derived from an analogue controlled voltage generated by phase locked loop 712. The analogue control voltage provides the delay element with a uniform delay that is regulated to a clock-timing period. This delay is independent of supply voltage, temperature, or process variations. Because all of the variable delay elements used in the de-skewing operation employ the same control voltage, the individual delays will not vary with voltage, temperature, or process.

Figure 8:
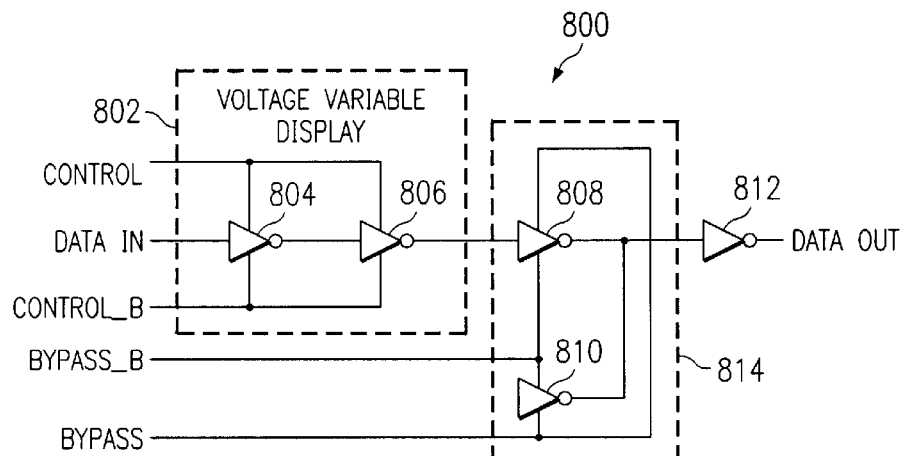
FIG. 8 is a logic block diagram of a unit of delay in accordance with a preferred embodiment of the present invention.

Turning now to FIG. 8, a logic diagram of a unit of delay is depicted in accordance with a preferred embodiment of the present invention. Delay element 800 includes a voltage variable delay 802 that basically includes inverters 804 and 806. In addition, delay element 800 also includes multiplexer 814 and buffer 812. Multiplexer 814 consists of two tri-state inverters, 808 and 810. A more detailed schematic of this delay is described below. For example, the first delay unit may include thirty-two delay elements, such as delay element 800. A second circuit may include sixteen elements and so on. Unused delay elements are bypassed with multiplexors so that an arbitrary number of delay elements may be used at any one time. Each delay element is non-inverting so that they may be added in series without changing the phase of the data signal.

Figure 9A:
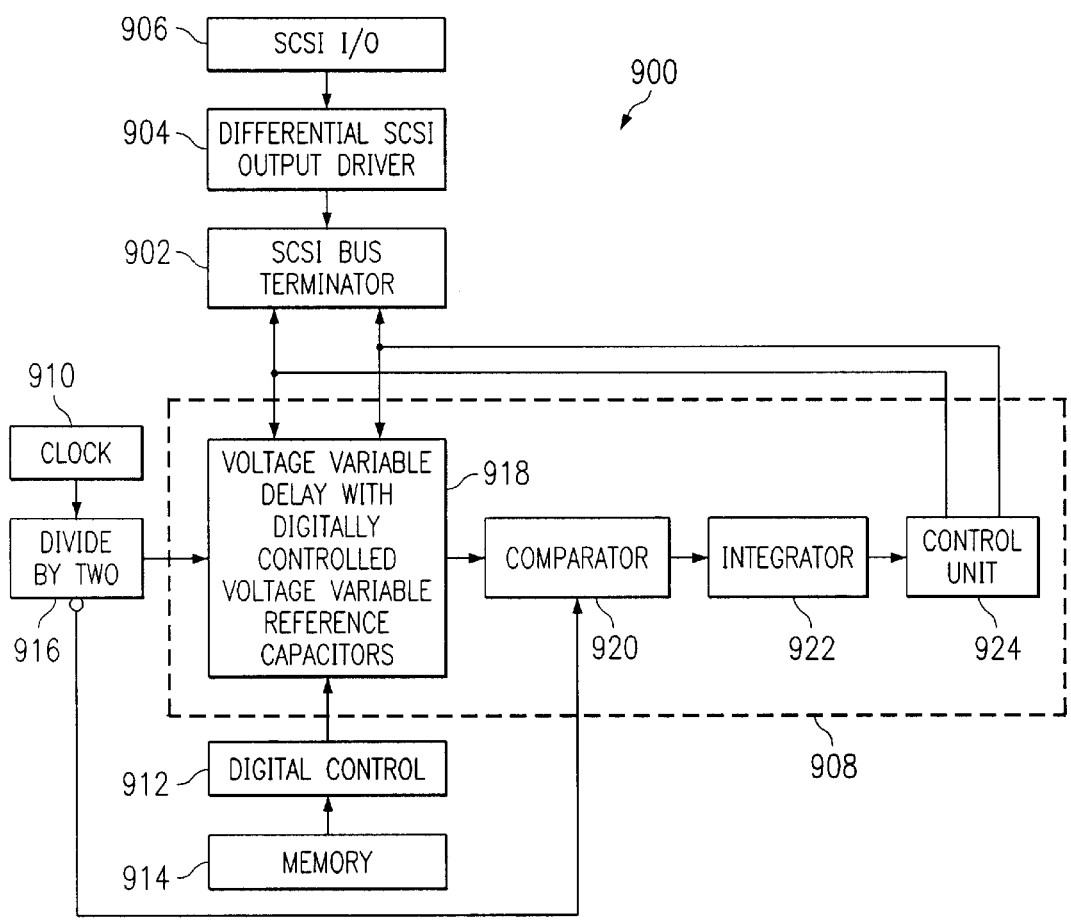
FIG. 9A is a block diagram of a control system for controlling the resistivity for on chip terminators in accordance with a preferred embodiment of the present invention.

With reference now to FIG. 9A, a block diagram of a control system for controlling the resistivity for on-chip terminators is depicted in accordance with a preferred embodiment of the present invention. Control system 900 is employed to control the variable resistivity in SCSI bus terminator 902. SCSI terminator 902 may be implemented within termination unit 208 in FIG. 2. SCSI terminator 902 receives data from differential SCSI output driver 904, which may be implemented within driver unit 206 in FIG. 2. This driver receives data from SCSI I/O 906, which may originate from SCSI logic, such as SCSI logic 202 in FIG. 2. Control system 900 includes a phase locked loop 908, which receives a clock signal 910 and is controlled by digital control 912, which receives data used to control phase locked loop 908 from memory 914. Digital control 912 receives data from memory 914 that contains the proper global voltage needed.

Phase locked loop 908 includes a divide by two circuit 916, which provides an output to voltage variable delay 918 and comparator 920. The output of divide by two circuit 916 contains un-delayed data, which is compared to the output of voltage variable delay 918, containing delayed data, by comparator 920. The result is a logic one or zero depending on the comparison. When too much delay is occurring, the output from comparator 920 is a logic 1, which results in a decrease in the amount of delay. When the delay is too little, a logic 0 is output from comparator 920 to increase the amount of delay in the system.

The output from comparator 920 is processed through integrator 922, which serves as a low pass filter. The output of integrator 922 is then fed to control unit 924. Control unit 924 essentially outputs an integrator complement signal with the integrator signal, or control voltage, Control_B_Out with Control_Out. Control unit 924 may be incorporated in voltage variable delay 918 or implemented as a separate component for picking off Control_Out and Control_B_Out signals for SCSI Bus Terminator 902.

Control unit 924 outputs Control_B_Out and Control_Out which are then fed back to voltage variable delay 918 and sent to SCSI terminator 902 to adjust the resistivity within the voltage variable resistors within SCSI bus terminator 902. Voltage variable delay 918 is controlled by digital control 912, which employs data from memory 914 to control the resistivity within SCSI terminator 902. Voltage variable delay 918 employs a reference capacitor that provides a controlled current source. The voltage variable reference capacitor is used in a timing delay chain that is in the phase locked loop with the clock and used as a timing reference. The phase locked loop produces a delay that is exactly equal to on half of the clock. Since the delay in the phase locked loop is matched to the clock, the time required to charge the capacitor is constant and the delay is slaved to the clock period from clock 910. As a result, the current in control delay element 924 is proportional to the supply voltage, and is independent of temperature and process variations. If the terminator resistance is considered to be the output voltage divided by the current, then the output resistance is constant, the result that is desired and provided by the present invention.

Figure 9B:
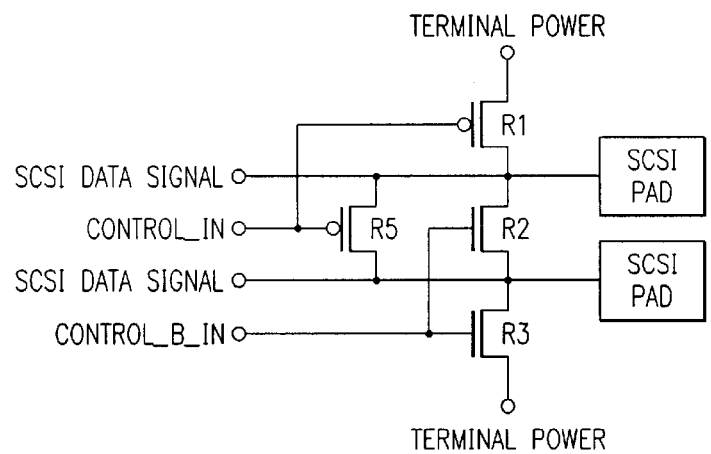
FIG. 9B is a block diagram of the on chip terminator in accordance with a preferred embodiment of the present invention.

FIG. 9B depicts a preferred embodiment of the SCSI bus terminator 902 illustrated in FIG. 9B. SCSI bus terminator 902 utilizes four CMOS transistors that are stabilized by generating a control gate voltage and applying the voltage to each of the transistor's gates. SCSI bus terminator 902 consists of two p-channel metal oxide semiconductor (PMOS) transistors, R1 and R5, and two n-channel metal oxide semiconductor (NMOS) transistors, R2 and R3. The four transistors are arranged with the source of transistor R1 connected to upper terminal power and the source of transistor R3 connects to lower terminal power. Transistors R2 and R5 are connected in parallel across the low voltage differential SCSI bus with the source of R5 oriented up and the source of R2 oriented down. Stabilization from voltage, temperature and process is accomplished by applying a positive control voltage from phase locked loop 908 to transistors R1 and R5 (Control_Out) and the complement control signal to transistors R2 and R3 (Control_B_Out).

Figure 10A:
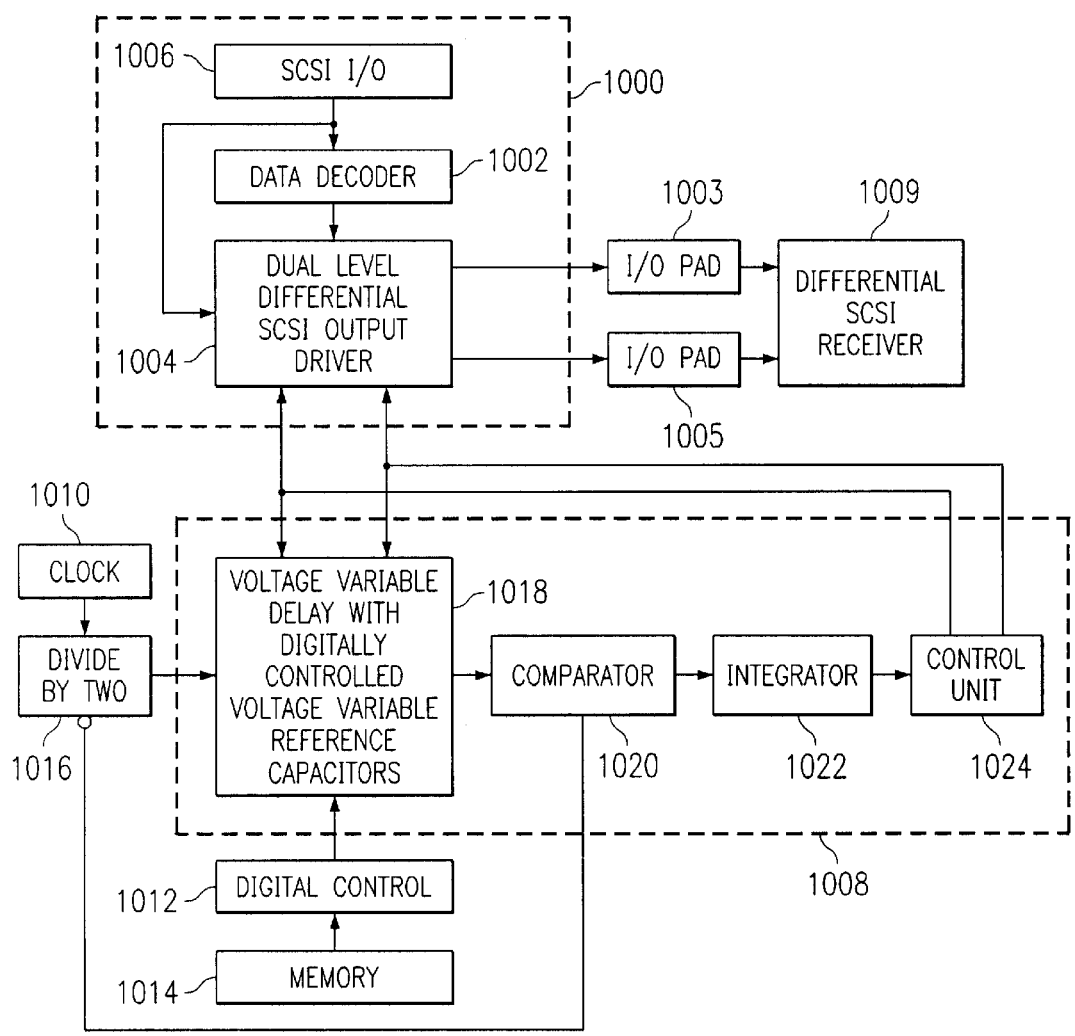
FIG. 10A is a block diagram of a system for controlling inter-symbol interference in multiple signals on high speed parallel buses.

With reference now to FIG. 10A, a block diagram of a control system that reduces the inter-symbol interference (ISI) problem for high speed parallel bus configurations such as the parallel SCSI bus. There are two components for reducing the ISI problem as in accordance with a preferred embodiment of the present invention. The first is data decoder 1002 that detects when current compensation is required and the second is the output driver embodied in dual differential SCSI output driver 1004 that has the variable drive capability to change the drive current on the first data pulse of the opposite polarity after a string of data pulses of the same value. This amounts to a one after a string of zeros or a zero after a string of ones.

Figure 10B:
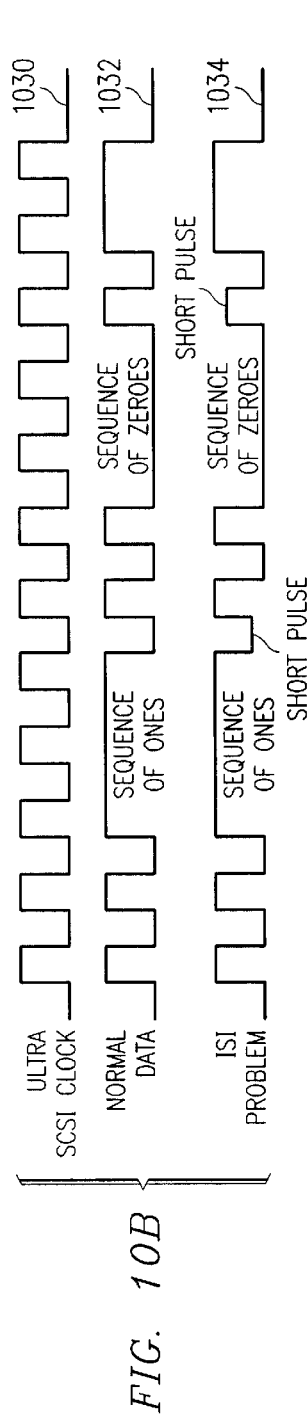
FIG. 10B illustrates a timing diagram showing the inter-symbol interference problem depicted on a data signal.

FIG. 10B is a timing diagram with illustrates the effects of inter-symbol interference on a data signal. Signal 1030 is a clock signal such as an Ultra 3 SCSI clock. Each one and zero is present and well formed, having the proper width and amplitude. Signal 1032 illustrates normal data referenced to clock signal 1030. Each one and zero is present and well formed, having the proper width and amplitude even though sequences of ones and zeros are transmitted as part of the data. Signal 1034 illustrates the ISI problem which results from excess capacitance of the SCSI bus, which becomes worse as the number of peripherals attached to the bus increases. The bus requires charging after being discharged with a series of ones or zeros, as can be seen on signal 1034 because of a "short pulse", which occurs immediately subsequent to a series of three or more consecutive ones or zeros.

Referring again to FIG. 10A, ISI reduction unit 1000 is employed to detect when current compensation is required to discharge the excess capacitance of the bus by increasing the drive current upon detection of a data sequence indicating a diminished amplitude data pulse. Dual differential SCSI output driver 1004 within driver unit 206, in FIG. 2. Driver 1004 receives data from SCSI I/O 1006, which may originate from SCSI logic, such as SCSI logic 202 in FIG. 2. Driver 1004 also receives a data signal form data decoder 1002 which in turn receives data from SCSI I/O 1006, which detects when current compensation is required by identifying data patterns indicating ISI problem. Data decoder 1002 recognizes the first one or zero after a string of at least three zeros or at least three ones and will adjust the resistance of a current mirror in dual differential SCSI output driver 1004 by a fixed amount. Decoder 1002 is essentially a three bit shift register and a pair of four input decoding gates. When the current data bit is a one and the last three bits are zeros, or when the current data bit is a zero and the last three bits are ones, the driver current needs to be boosted on the current output data bit. Dual differential SCSI output driver 1004 is connected to I/O pads 1003 and 1005 where the outputs are feed to differential SCSI Receiver 1009.

The current source for the output drivers in ISI reduction unit 1000 is proportional to the supply voltage but independent of temperature and process variations by supplying control voltages from phase locked loop 1008 to voltage sensitive resistor in the current variable drivers. Control voltages for are taken from phase locked loop 1008, which receives a clock signal 1010 and is controlled by digital control 1012, which receives data used to control phase locked loop 1008 from memory 1014. Digital control 1012 receives data from memory 1014 that contains the proper global voltage needed.

Phase locked loop 1008 includes a divide by two circuit 1016, which provides an output to voltage variable delay 1018 and comparator 1020. The output of divide by two circuit 1016 contains un-delayed data, which is compared to the output of voltage variable delay 1018, containing delayed data, by comparator 1020. The result is a logic one or zero depending on the comparison. When too much delay is occurring, the output from comparator 1020 is a logic 1, which results in a decrease in the amount of delay. When the delay is too little, a logic 0 is output from comparator 1020 to increase the amount of delay in the system.

The output from comparator 1020 is processed through integrator 1022, which serves as a low pass filter. The output of integrator 1022 is then fed to control unit 1024. Control unit 1024 essentially outputs an integrator complement signal with the integrator signal, or control voltage, Control_B_Out with Control_Out. Control unit 1024 may be incorporated in voltage variable delay 1018 or implemented as a separate component for picking off Control_Out and Control_B_Out signals for Dual differential SCSI output driver 1004. Control unit 1024 outputs Control_B_Out and Control_Out are then feed back to voltage variable delay 1018 and sent to Dual differential SCSI output driver 1004 to regulate the drive current in dual level differential output driver 1004.

Figure 10C:
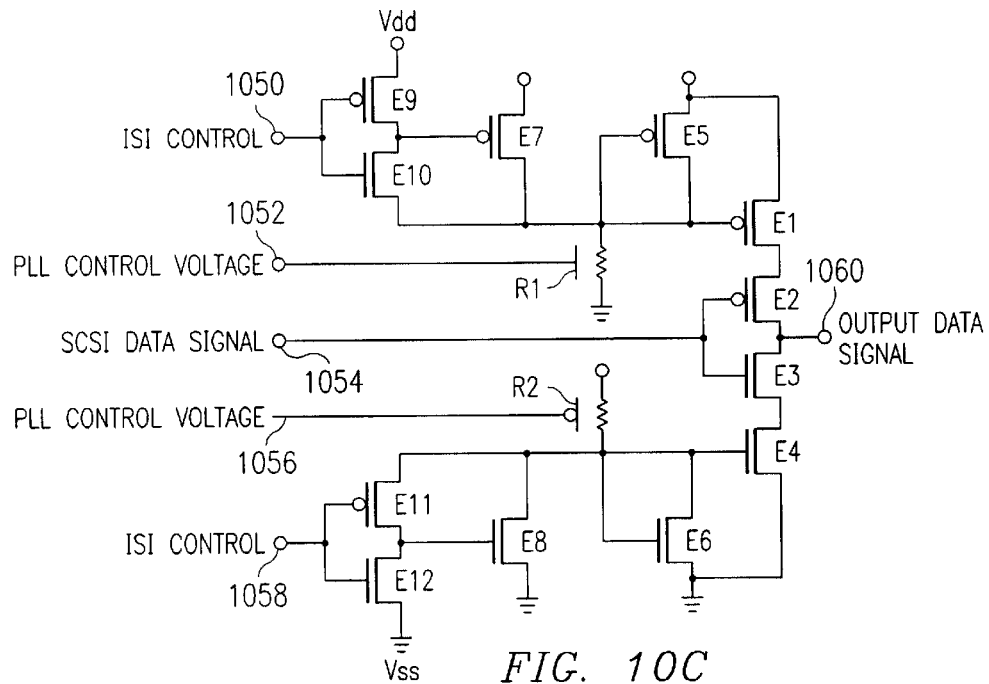
FIG. 10C illustrates an output driver that has the variable drive capability to change the drive current on the first data pulse of the opposite polarity after a string of data pulses of the same value in accordance with a preferred embodiment of the present invention.

Voltage variable delay 1018 is controlled by digital control 1012, which employs data from memory 1014 to control a current source within voltage variable delay 1018. Voltage variable delay 1018 employs a reference capacitor that provides a controlled current source. The capacitor is constant and the delay is slaved to the clock period from clock 1010. As a result, the current in the voltage control delay element is proportional to the supply voltage, and is independent of temperature and process variations. FIG. 10C is a block diagram illustrating the output driver that has the variable drive capability to change the drive current on the first data pulse of the opposite polarity after a string of data pulses of the same value in accordance with a preferred embodiment of the present invention. A preferred embodiment of the output driver of the present invention includes transistors E1–E4 with transistors E1 and E2 being p-channel metal oxide semiconductor (PMOS) transistors, while transistors E3 and E4 are n-channel metal oxide semiconductor (NMOS) transistors. The gates of transistors E2 and E3 are connected to the a SCSI data signal source such as the output of differential compensation delay unit 220 in delay unit 204 in FIG. 2. The gates of transistors E1 and E4 are controlled by current sources which are controlled by data decoder 1002 in FIG. 10A and that are proportional to a supply voltage but independent of temperature and process variations by supplying control voltages from phase locked loop 1008. The control voltages are applied to voltage sensitive resistors R1 and R2 which are connected to the gates of transistors E1 and E4, respectively, in the current variable drivers. PLL control voltage 1052 is supplied to the gate of a NMOS transistor R1 and PLL control voltage 1056 is supplied to the gate of a PMOS transistor R2. The gate of transistor E1 is controlled by a current source consisting of PMOS transistor E5 and NMOS resistor R1. ISI control 1050 is connected to the gates, where the sources of transistors E9 and E10 are connected to upper power supply voltage $V_{dd}$. Transistors E9 and E10 are connected by their drains to the gate of PMOS transistor E7. The sources of transistors E7, E9 and E5 and E1 are connected to upper power supply voltage $V_{dd}$. The gate of transistor E4 is controlled by a current source consisting of NMOS transistors E6 and E8 and PMOS resistor R2. ISI control 1058 is connected to the gates of E11 and E12. The sources of transistors E4, E6, E8 and E12 are connected to lower power supply voltage $V_{ss}$. Transistors E12 and E11 are connected by their drains to the gate of NMOS transistor E8. The source of transistor E8 is connected to lower power supply voltage $V_{ss}$. Output data signal 1060 is taken from the drains of transistors E2 and E3.

Figure 10D:
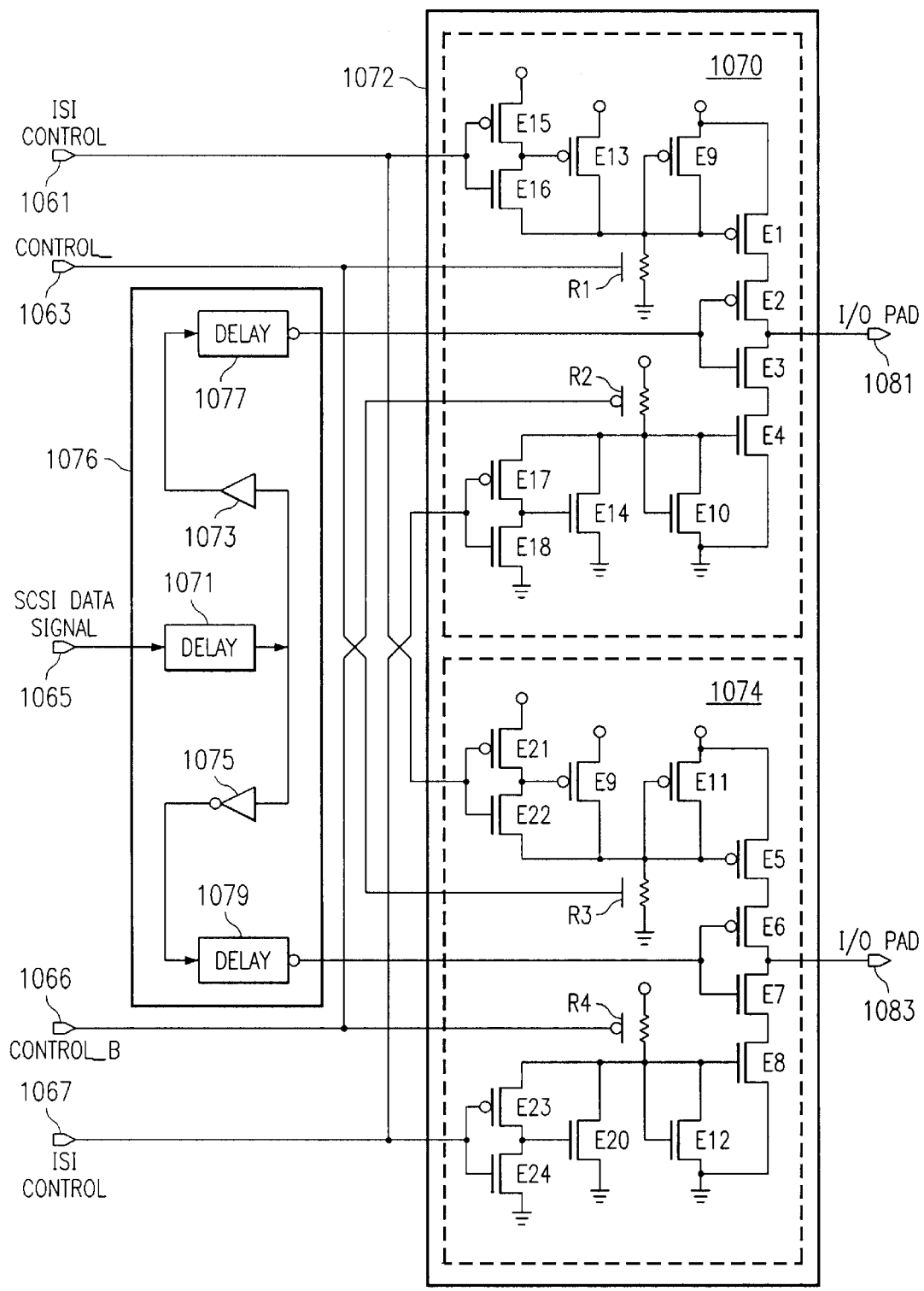
FIG. 10D illustrates a pair of output drivers configured in a dual level differential ISI output driver in accordance with a preferred embodiment of the present invention.

FIG. 10D illustrates a pair of output drivers configured in a dual level differential ISI output driver in accordance with a preferred embodiment of the present invention. The pair of output drivers, driver 1070 and driver 1074, contained in driver 1072, of a preferred embodiment of the present invention, may be implemented in driver 224 in FIG. 2. FIG. 10D depicts two output drivers of the type depicted in FIG. 10C which are controlled by current sources which are controlled by the data decoder and further using a PLL control voltage for stabilizing voltage sensitive resistors for stabilizing the output of the current sources. Drivers 1070 and 1074 are identical to the type of driver depicted in FIG. 10C.

Figure 11:
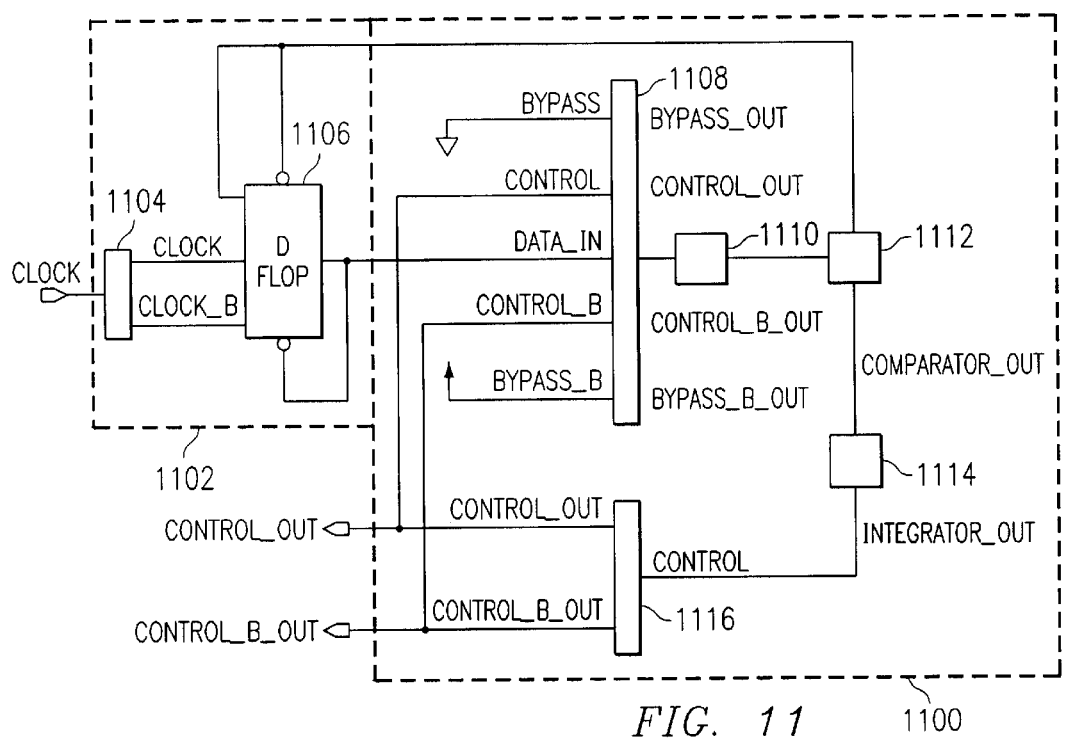
FIG. 11 is a block diagram of a phase locked loop circuit in accordance with a preferred embodiment of the present invention.

With reference now to FIG. 11, a block diagram of a phase locked loop circuit is depicted in accordance with a preferred embodiment of the present invention. Phase locked loop circuit 1100 may be used within phase locked loop circuit 712 in FIG. 7 or phase locked loop circuit 908 in FIG. 9A.

In this example, phase locked loop circuit 1100 receives clock signals from a divide by two circuit 1102, which includes a two phase clock generator 1104 and a D flip-flop 1106. In addition, phase locked loop 1100 includes a delay unit 1108, which may include one or more delay elements. Phase locked loop 1100 also includes a buffer 1110, a comparator 1112, and integrator 1114, and a control unit 1116. Divide by two circuit 1102 is used to divide the clock signal, which is sent into delay unit 1108 as data, Data_In. Delay unit 1108 is a variable voltage delay, which is controlled by control unit 1116. The output of delay unit 1108 is sent to a buffer 1110 with the data then being compared at comparator 1112 with the clock signal to generate either a logic 1 or 0. This signal is then passed through integrator 1114. The output of integrator 1114 is used as a control signal for control unit 1116.

Figure 12A:
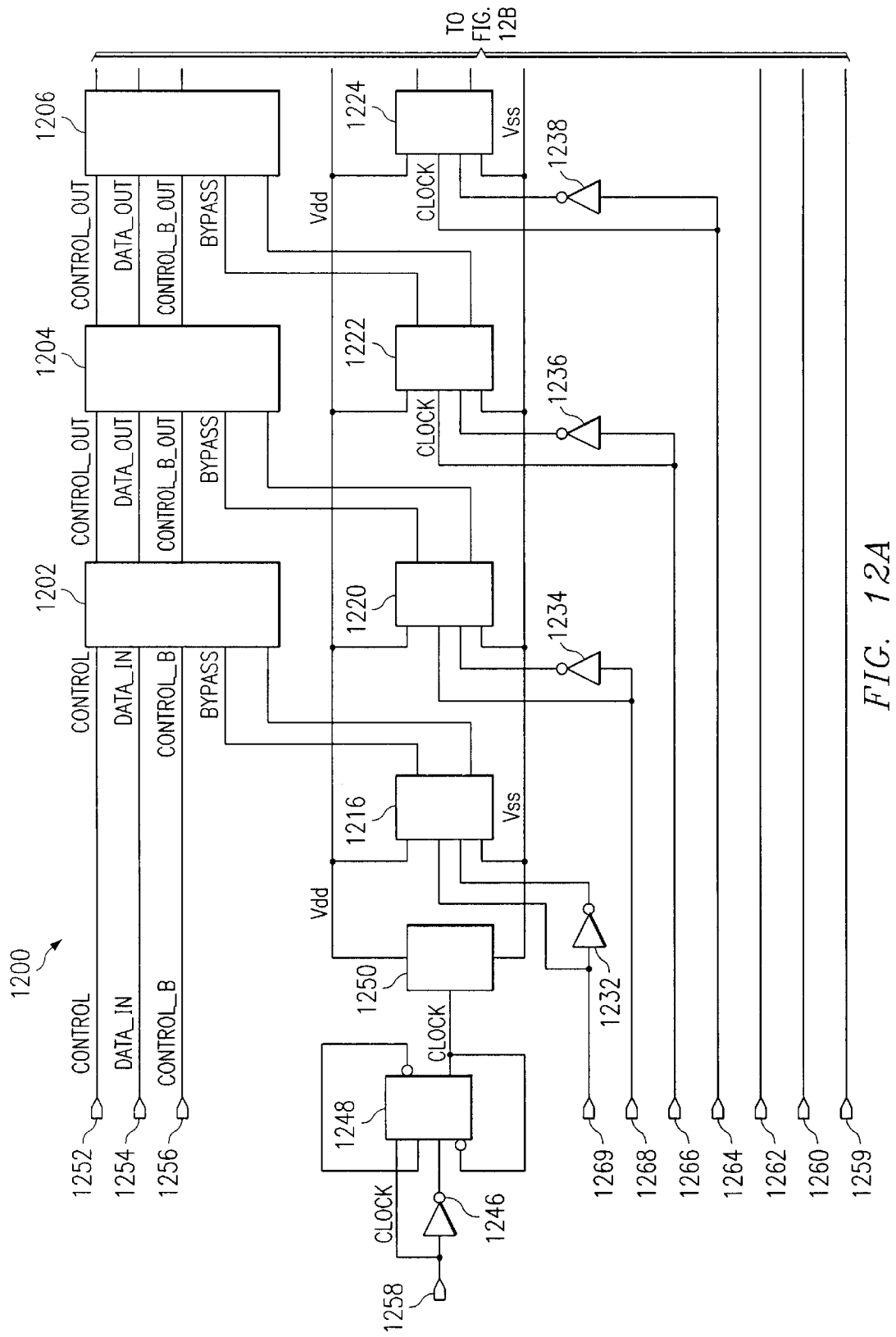
FIGS. 12A–12B, are a diagram of a digitally controlled voltage variable delay in accordance with a preferred embodiment of the present invention.
Figure 12B:
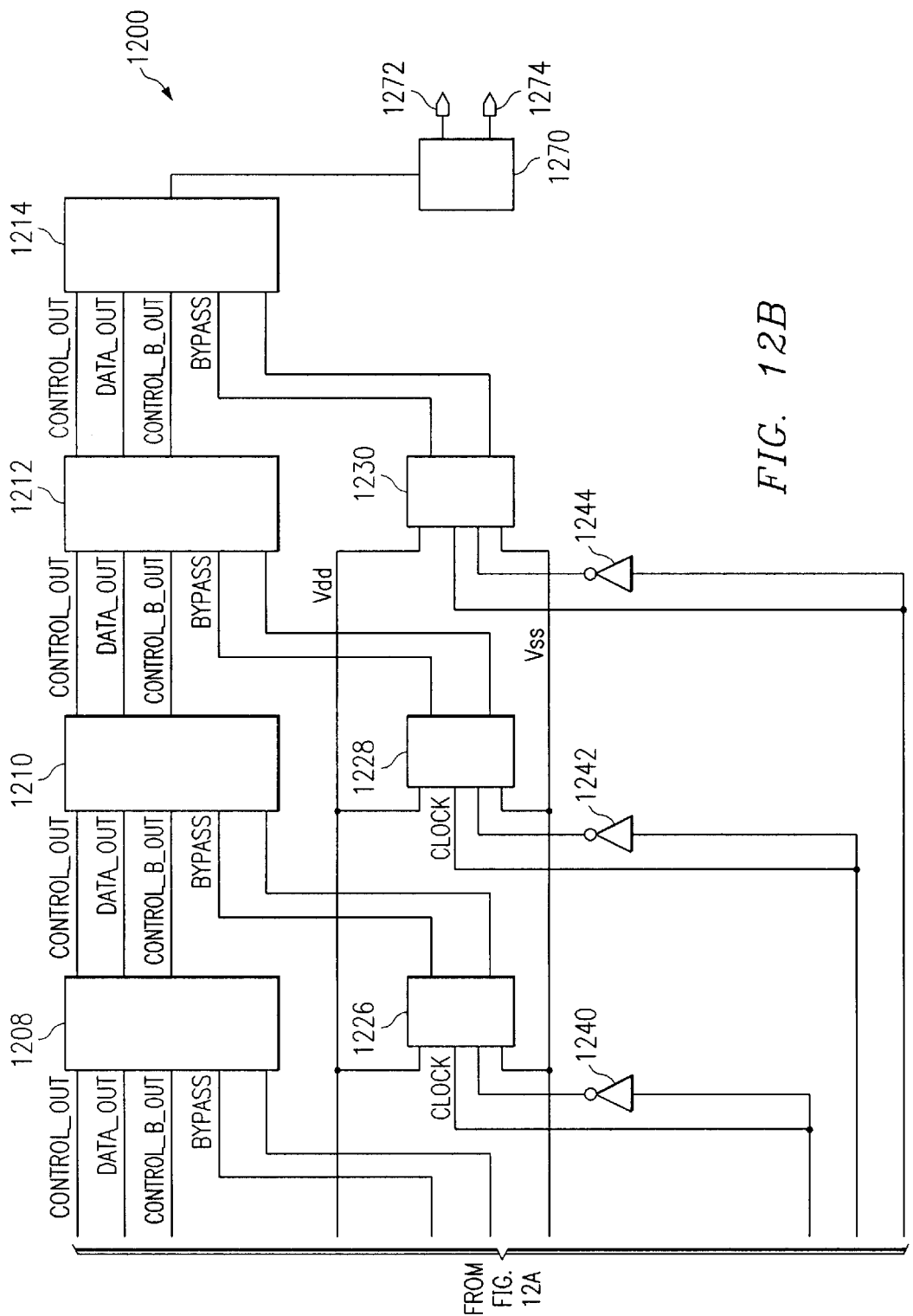

With reference now to FIGS. 12A–12B, a diagram of a digitally controlled voltage variable delay is depicted in accordance with a preferred embodiment of the present invention. Voltage variable delay chain 1200 is a digitally controlled voltage variable delay in this example. In this example, voltage variable delay chain 1200 includes delay units 1202–1214. Delay unit 1202 provides a weighted delay of 32, while delay unit 1204 provides a weighted delay of 16. Delay unit 1206 provides a delay of 8, delay unit 1208 provides a delay of 4, and delay unit 1210 provides a delay of 2. Delay units 1212 and 1214 provide a delay of 1 in this example. Of course, other types of delays within the delay units and other numbers of delay units may be employed depending on the implementation.

Voltage variable delay chain 1200 also includes D flip-flops 1216–1230. These D flip-flops are used to hold binary words, which are read from a memory to selectively turn on or turn off various delay units within voltage variable delay chain 1200. Voltage variable delay chain 1200 includes a two phase clock generator to provide a clock signal to the registers that control delay chain 1200. In addition inverter 1246, D flip-flop 1248, and two-phase clock generator 1250 which provides a two-phase clock signal to the resistors consisting of D flip-flops 216–230. In this example, a control signal is applied to input 1252. Data is applied to voltage variable delay chain 1200 at input 1254. A complimentary control signal is applied to voltage variable delay chain 1200 at input 1256. A clock signal is applied to voltage variable delay chain 1200 at input 1258. Inputs 1259–1269 provide input for seven bits, which are used to selectively enable and disable various delay units within voltage variable delay chain 1200. The output from two phase clock generator 1270 provides complimentary outputs for the data at input 1254 at outputs 1272 and 1274. The data at these outputs are delayed based on which delay units are enabled or disabled within voltage variable delay chain 1200. The clock generators generate a clock for the D flip-flops in this example.

Figure 13:
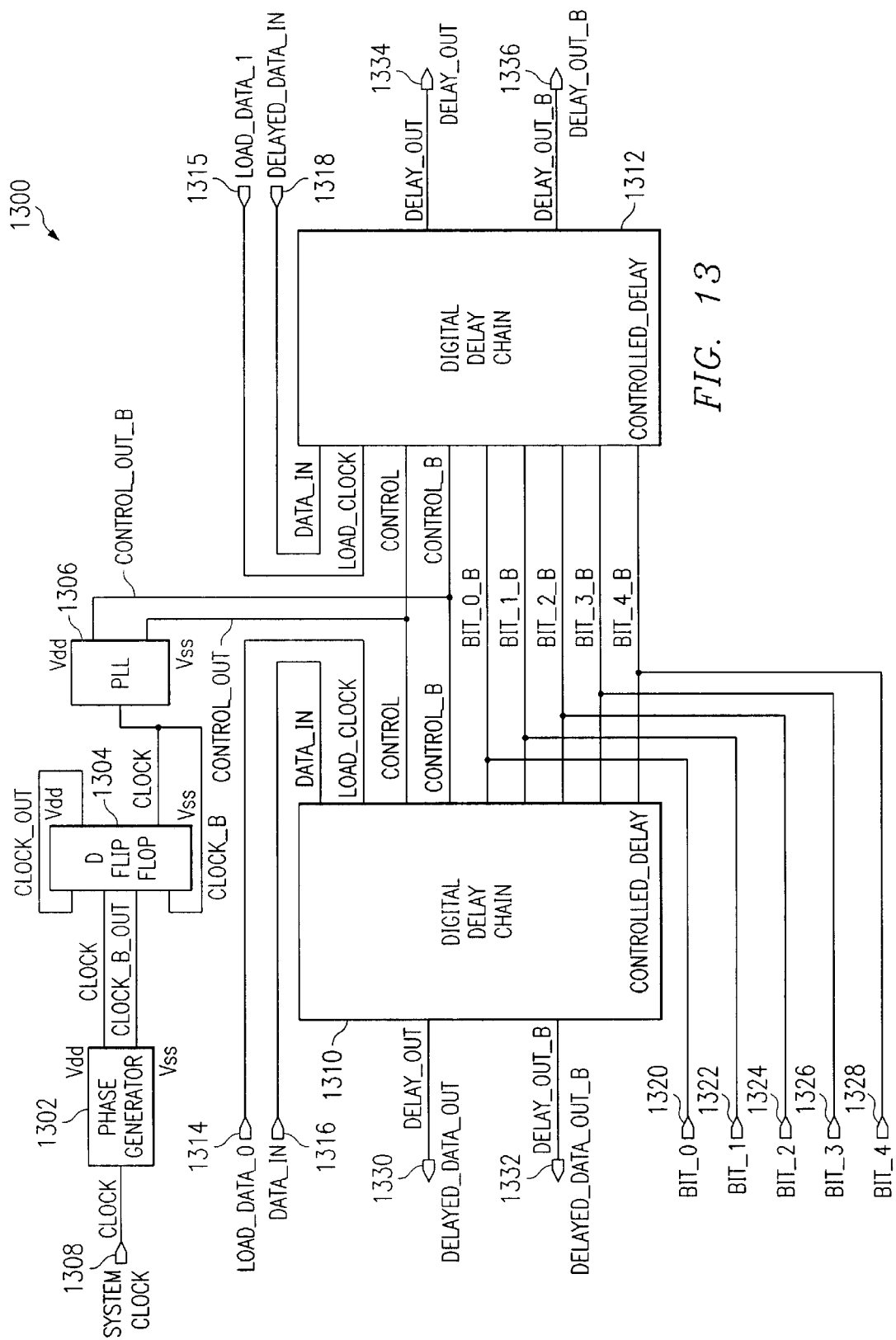
FIG. 13 is a block diagram of a SCSI pad delay system in accordance with a preferred embodiment of the present invention.

With reference now to FIG. 13, a block diagram of a differential SCSI pad delay system is depicted in accordance with a preferred embodiment of the present invention. Pad delay system 1300 is an example of a delay system that is used for a delay line within a SCSI bus system, such as delay 220 and delay 222 in FIG. 2. A pad delay system 1300 is employed for each data line within the differential SCSI bus.

Pad delay system 1300 includes a divide by two circuit that is made up of two-phase clock generator 1302 and D flip-flop 1304. Phase locked loop (PLL) circuit 1306 receives the divided clock signal from D flip-flop 1304. Phase locked loop circuit 1306 may be implemented using a phase locked loop circuit, such as phase locked loop circuit 1100 in FIG. 11. Control signals are generated from a system clock input at input 1308. The output of these control signals is sent to digital delay chain 1310 and digital delay chain 1312. These digital delay chains are implemented using a digital delay chain, such as voltage variable delay chain 1200 in FIGS. 12A–12B. A load_data _0 signal is applied to these to the delay chain at input 1314. A second signal, load_data _1 signal, is applied to these to delay chain at input 1315. Data and delay data is applied to the digital delay chain from inputs 1316 and 1318, respectively. Digital delay chain 1310 and digital delay chain 1312 have variable delays, which may be controlled by bits applied to inputs 1320–1328, which receive bits 0–4, respectively. This is similar to the controls illustrated in FIGS. 12A–12B for voltage variable delay chain 1200. Outputs 1330 and 1332 are complimentary outputs for delay data exiting digital delay chain 1310. Similarly, outputs 1334 and 1336 also provide complimentary outputs for delayed data exiting digital delay chain 1312. These outputs provide a delayed SCSI I/O, such as the outputs from delay 1077 and delay 1079 in FIG. 10D.

Voltage variable delay chain 1200 may be used as a voltage variable delay without digital control and the various flip-flops used to hold the words are not employed.

Figure 14:
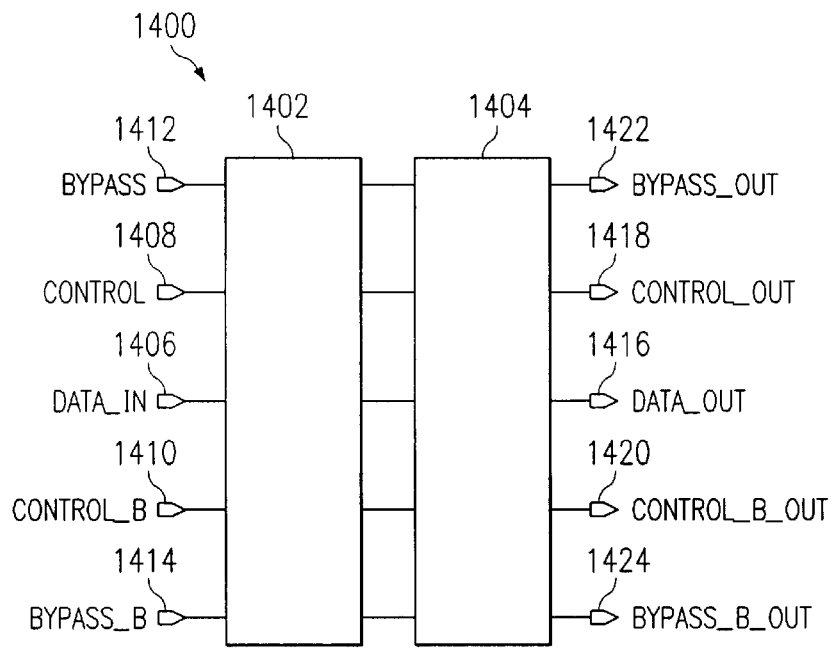
FIG. 14 is a block diagram of a two-element delay in accordance with a preferred embodiment of the present invention.

With reference next to FIG. 14, a block diagram of a two-element delay is depicted in accordance with a preferred embodiment of the present invention. This two-element delay is an example of a delay, which may be used in a digital delay chain, such as voltage variable delay chain 1200 in FIGS. 12A–12B. In particular, this two-element delay may be used to implement delay unit 1210 in FIG. 12B.

In this example, input delay unit 1402 is coupled to an output delay element 1404 to form two-element delay 1400. Input delay element 1402 includes an input 1406, which is used to receive data, Data_In. Voltage control signals Control and Control_B are applied to input 1408 and 1410, respectively. The control signal applied to 1410 is a complimentary signal to the signal applied to input 1408. Bypass signals are applied to inputs 1412 and 1414. Output delay element 1404 contains an output 1416, used to output data, Data_Out that has been delayed through two-element delay 1400. In addition, outputs 1418 and 1420 are used to pass through control signals applied to inputs 1408 and 1410. Outputs 1422 and 1424 are outputs for the bypass signals applied to inputs 1412 and 1414.

Figure 15:
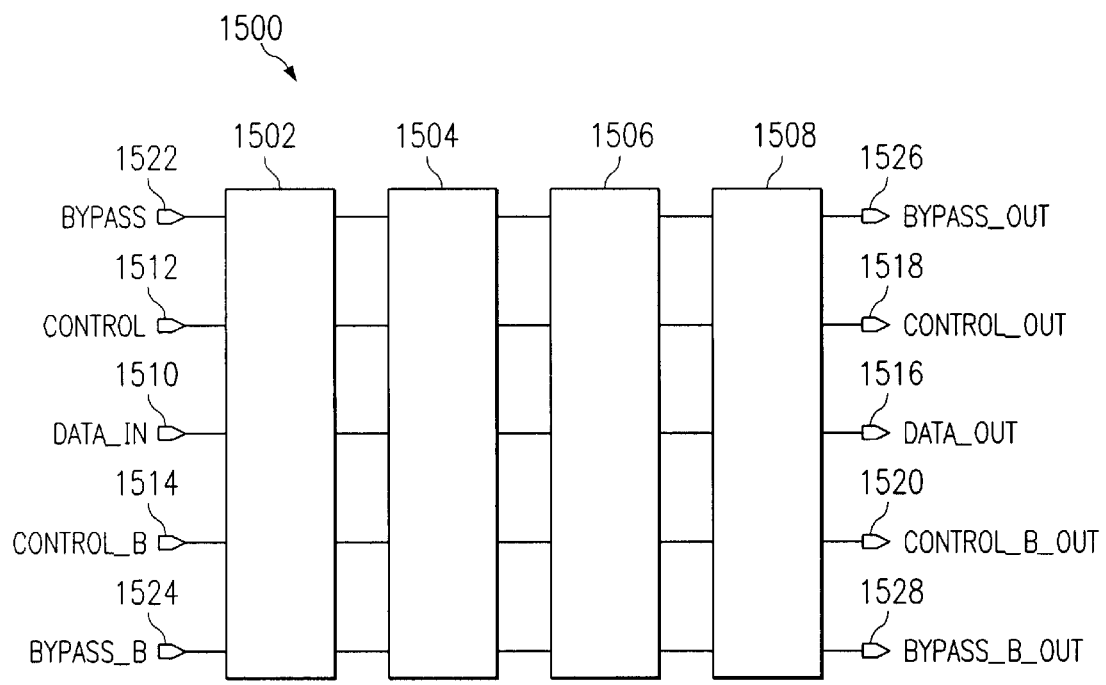
FIG. 15 is a block diagram of a four-element delay in accordance with a preferred embodiment of the present invention.

With reference now to FIG. 15, a block diagram of a four-element delay is depicted in accordance with a preferred embodiment of the present invention. This four-element delay may be used as a delay unit within a digital delay chain, such as voltage variable delay chain 1200 in FIGS. 12A–12B. For example, four-element delay 1500 may be used to implement delay unit 1208 in FIG. 12B.

Four-element delay 1500 contains input delay element 1502, center delay element 1504, center delay element 1506, and output delay element 1508. Data signals are applied to input 1510 while voltage control signals are applied to input 1512 and 1514. The control signal applied to input 1514 is a complimentary control signal to the one applied to input 1512. Data is outputted through output 1516 with the control signals being output at output 1518 and 1520. In addition, four-element delay 1500 also provides two inputs, input 1522 and input 1524 for bypass signals, which are passed through to outputs 1526 and 1528. FIGS. 14 and 15 have been provided to give examples of various delay units that may be created through chaining together delay elements. Of course, other numbers of delay elements may be put together to create other types of delays.

Figure 16:
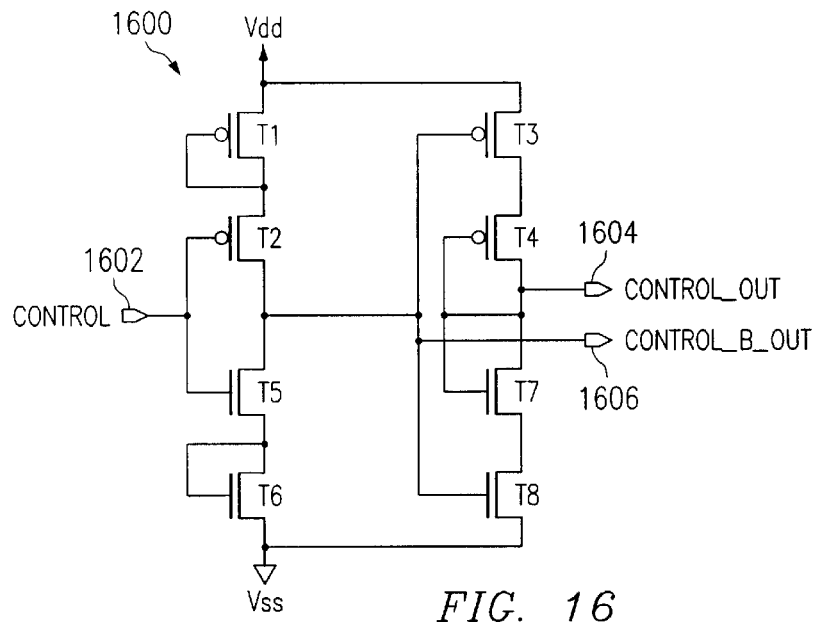
FIG. 16 is a schematic diagram of a delay element control circuit in accordance with a preferred embodiment of the present invention.

Turning now to FIG. 16, a schematic diagram of a delay element control circuit is depicted in accordance with a preferred embodiment of the present invention. This circuit provides a pair of inverters such that the outputs do not swing close to the upper or lower power supply voltages. This circuit is employed within control unit 724 in FIG. 7, control unit 924 in FIG. 9A and voltage variable delay 818 in FIG. 8 to provide control for the delay elements. Delay element control circuit 1600 includes transistors T1–T8. Transistors T1–T4 are p-channel metal oxide semiconductor (PMOS) transistors in this example. Transistors T5–T8 are n-channel metal oxide semiconductor (NMOS) transistors in this example. Transistors T2 and T5 form an inverter with their gates connected to input 1602, which is a control input. Transistor T1 is a diode connected transistor in this example. Transistor T6 also is configured as a diode in this example. Transistors T3 and T8 form an inverter while transistors T4 and T7 are diode connected transistors. Transistors T1, T4, T6, and T7 provide the threshold voltages that prevents the output from swinging to $V_{dd}$ or $V_{ss}$. This circuit is powered by connecting the sources of transistors T1 and T3 to an upper power supply voltage, $V_{dd}$, and the sources of transistors T6 and T8 to a lower power supply voltage, $V_{ss}$.

Output 1604 is connected to the drains of transistors T4 and T7. Output 1606 is connected to the drains of transistors T2 and T5. Output 1606 is a complimentary control output to output 1604. Transistors T4 and T7 have their gates tied to their drains. Output 1604 and output 1606 generate signals Control_Out and Control_B_Out, respectively. These control signals are used to control various delay elements in accordance with a preferred embodiment of the present invention.

Figure 17:
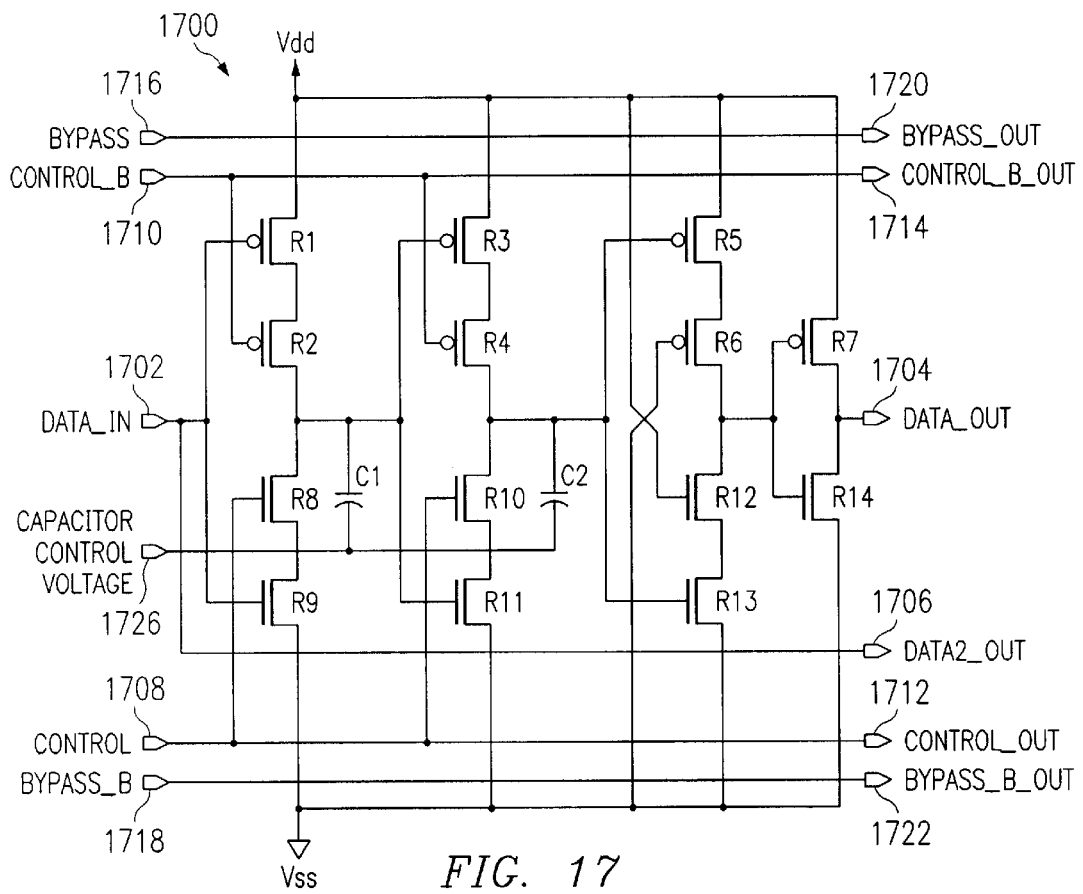
FIG. 17 is a schematic diagram of an input delay element in accordance with a preferred embodiment of the present invention.

With reference now to FIG. 17, a schematic diagram of an input delay element is depicted in accordance with a preferred embodiment of the present invention. Input delay element 1700 includes transistors R1–R14. In this example, transistors R1–R7 are PMOS transistors while transistors R8–R14 are NMOS transistors. The circuit is powered by connecting the sources of transistors R1, R3, R5 and R7 to upper power supply voltage $V_{dd}$. Transistors R9, R11, R13, and R14 have their source connected to lower power supply voltage $V_{ss}$. Additionally, the gate of transistor R6 is connected to lower power supply voltage $V_{ss}$. The gate of transistor R12 is connected to upper power supply voltage $V_{dd}$.

Transistors R5, R6, R12, and R13 form a dummy multiplexor stage that provides the same delay such that a multiplexor stage within the output delay element has the same delay as in this delay element. Capacitor C1 is connected between capacitor voltage source 1726 and the drains of transistors R2 and R8 and the gates of transistors R3 and R11. Capacitor C2 is connected between capacitor voltage source 1726 and the drains of transistors R4 and R10 and the gates of transistors R5 and R13. The capacitors are constant and the delay is slaved to the clock period from. As a result, the current and the voltage control delay element is proportional to the capacitor voltage source, and is independent of temperature and process variations. The capacitors are P type diffusion in an N-well. The voltage potential on the N-well can be changed to vary the average capacitance to compensate for process variations in the value of the capacitor and mobility variations in the N and P channels. Capacitor control voltage on the N-well is derived from a digital to analog converter (not shown). A register is used to store a digital value that is equivalent to the proper analog voltage. The digital reference value is used to trim the capacitor is stored in a non-volatile RAM that is used in conjunction with the SCSI chip to store system configuration and manufacturing data. The output delay element will be described in more detail below with respect to FIG. 18.

Data is applied to input 1702 and output 1704 and 1706 from outputs for the signal Data_In. Output 1704 provides an output for the data. Input delay element 1700 is controlled through the application of control signals to input 1708 and 1710 in this example the signal control is applied to input 1708, while a complimentary signal Control_B is applied to input 1710. These control signals also are output at outputs 1712 and 1714 of input delay element 1700. Input delay element 1700 also includes inputs 1716 and 1718, which are bypass inputs. The signal applied at input 1716 is complimentary to the signal and applied at input 1718. Outputs 1720 and 1722 are present in input delay element 1700 for these bypass signals. The control signal applied to input 1708 is used to control the gate of transistor R8 and the gate of transistor R10. The control signal applied to input 1710 is used to control the gate of transistor R2 and the gate of transistor R4.

Figure 18:
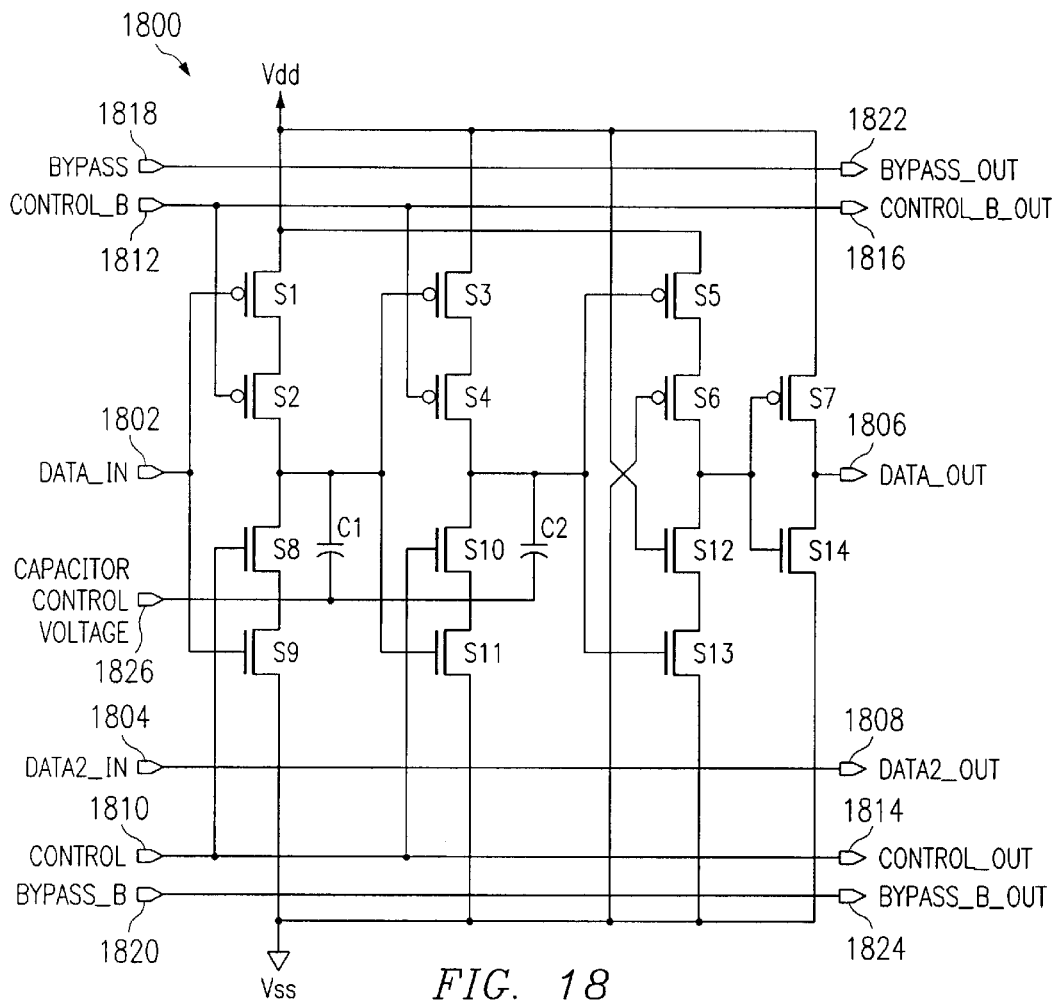
FIG. 18 is a schematic diagram of a delay element in accordance with a preferred embodiment of the present invention.

Turning next to FIG. 18, a schematic diagram of a center delay element is depicted in accordance with a preferred embodiment of the present invention. Delay element 1800 in the depicted example contains transistors S1–S14. Transistors S1–S7 are PMOS transistors while transistors S8–S14 are NMOS transistors. Delay element 1800 is powered by connecting the sources of transistors S1, S3, S5 and S7 to upper power supply voltage $V_{dd}$, while connecting the sources of transistors S9, S11, S13 and S14 to the lower power supply voltage $V_{ss}$. The gate of transistor S12 is also connected to upper power supply voltage $V_{dd}$, while the gate of transistor S6 is connected to lower power supply voltage $V_{ss}$. Capacitor C1 is connected between capacitor voltage source 1826 and the drains transistors S2 and S8 and the gates of transistors S3 and S11. Capacitor C2 is connected between capacitor voltage source 1826 and the drains of transistors S4 and S10 and the gates of transistors S5 and S13.

Data signals, Data__In and Data2__In, enter delay element 1800 at inputs 1802 and 1804. Data is output from data element 1800 at outputs 1806 and 1808. In this example, input 1804 and output 1808 form a pass through for data in delay element 1800. While data input at input 1802 is delayed through delay circuitry formed by transistors S1–S14 before being output through output 1806. The transistors are controlled through the use of signal Control and Control__B, which are applied to inputs 1810 and 1812 respectively. These control signals are output from delay element 1800 at outputs 1814 and 1817, respectively. In addition, delay element 1800 includes an input for bypass signals. Inputs 1818 and 1820 provide the input for bypass signals Bypass and Bypass__B. These bypass signals are output from delay element 1800 at outputs 1822 and 1824.

Figure 19:
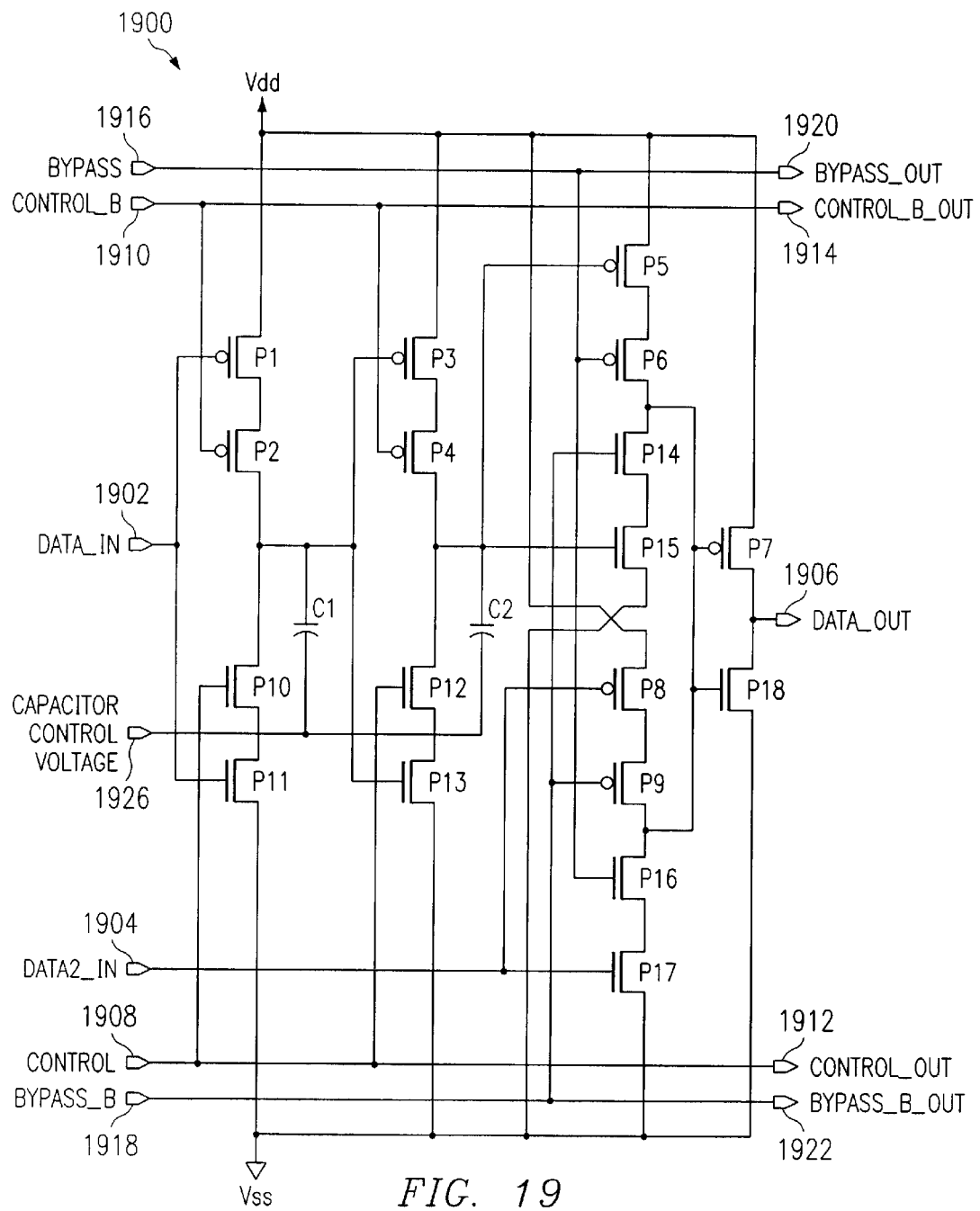
FIG. 19 is a schematic diagram of an output delay element in accordance with a preferred embodiment of the present invention.

Turning next to FIG. 19, a schematic diagram of an output delay element is depicted in accordance with a preferred embodiment of the present invention. Output delay element 1900 includes transistors P1–P18. Transistors P1–P9 are PMOS transistors while transistors P10–P18 are NMOS transistors. Delay output element 1900 is powered by connecting the sources of transistors P1, P3, P5, P7 and P8 to upper power supply voltage $V_{dd}$, while transistors P11, P13, P15, P17, and P18 have their sources connected to lower power supply voltage $V_{ss}$.

Data enters delay output element 1900 through input 1902 and input 1904. The signal Data__In is applied to input 1902 while signal Data2__In is applied to input 1904. This results in a single data signal, Data__Out, being generated at output 1906.

Delay output element 1900 is controlled through the application of control signals control and control B being applied to input 1908 and 1910, respectively. The control signal controls the gate of transistors P10 and P12. The control B signal controls the gate of transistors P2 and P4. Additionally, these transistors are passed through delay output element 1900 through output 1912 and 1914. Additionally, delay output element 1900 includes inputs 1916 and 1918, which are used to receive bypass signals bypass and bypass B, which are sent to outputs 1920 and 1922. Capacitor C1 is connected between capacitor voltage source 1926 and the drains of transistors P2 and P8 and the gates of transistors P3 and P13. Capacitor C2 is connected between capacitor voltage source 1926 and the drains of transistors P4 and P12 and the gates of transistors P5 and P15. Input 1904 in output delay element 1900 provides an input for Data2__In. This input runs data through output delay element 1900 without delay. Input 1902 receives Data__In and provides an input for running delayed data. Transistors P5, P6, P14, P15, P8, P9, P16, and P17 perform multi-plexing functions in this example. These transistors are used to select between the data applied to input 1902 and to the data applied to input 1904 to output the selected data at output 1906.

Figure 20:
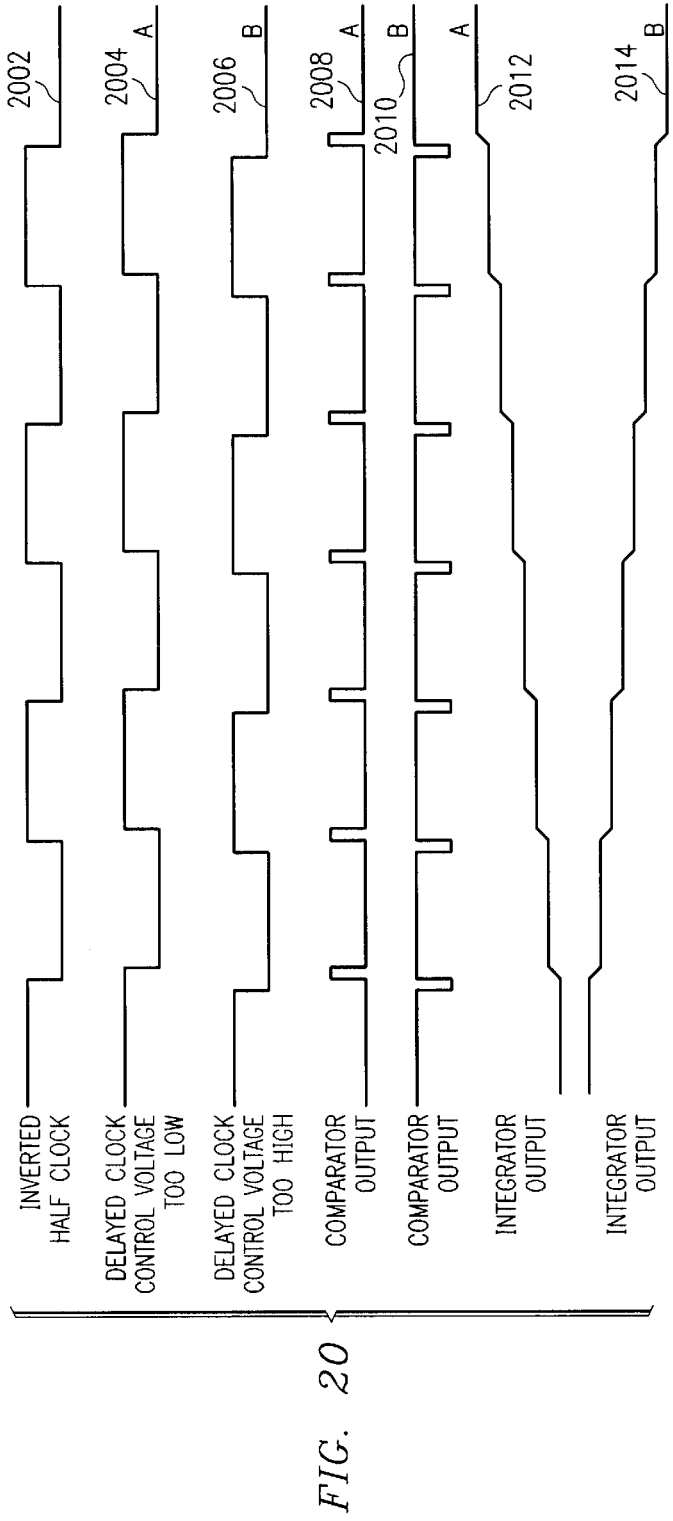
FIG. 20 is a timing diagram representing the signals present on a phase locked loop circuit.

FIG. 20 is a timing diagram representing the signals present on a phase locked loop circuit as might be user in any of FIGS. 7, 9A and 10A. Signal 2002 illustrates an inverted half clock as output from a divide by two unit of a conventional phase locked loop circuit. Signals 2004 and 2006 represent the delayed clock signal resulting from a control voltage which is too low and which is too high, respectively. Both signal 2002 and one of signals 2004 or 2006 are input to a comparator which outputs a logical one, signal 2008, in the case of comparing signal 2002 signal 2004, or signal 2010, in the case of comparing signal 2002 signal 2006. Signal 2008 is integrated in an integrator, which is essentially a low pass filter, and resultant signal 2012 is used as a control voltage for decreasing the delay in the phase locked loop. Signal 2010 is integrated in an integrator, which is essentially a low pass filter, and resultant signal 2014 is used as a control voltage for increasing the delay in the phase locked loop.

Figure 22:
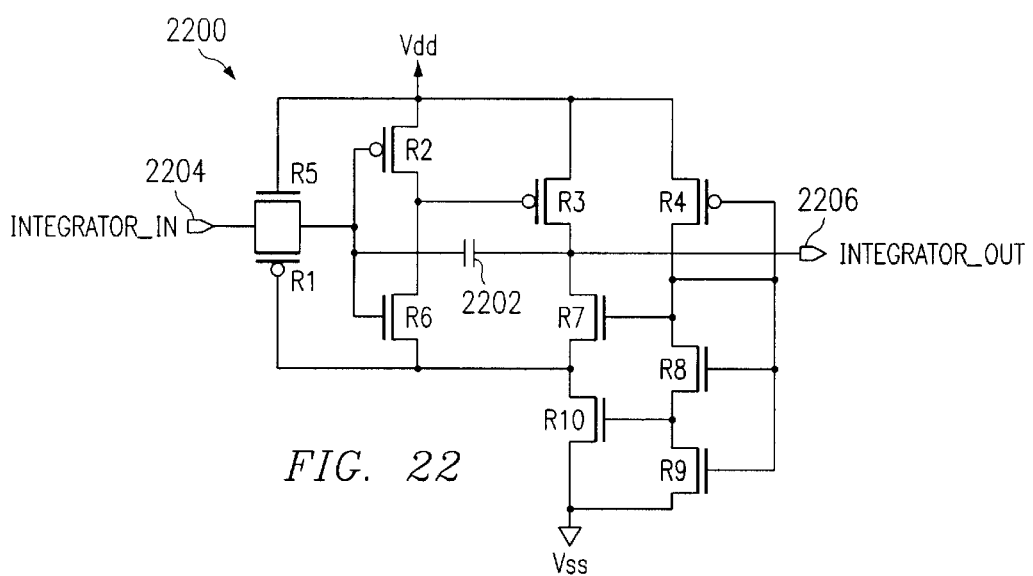
FIG. 22 is a schematic diagram depicting the integrator.
Figure 21:
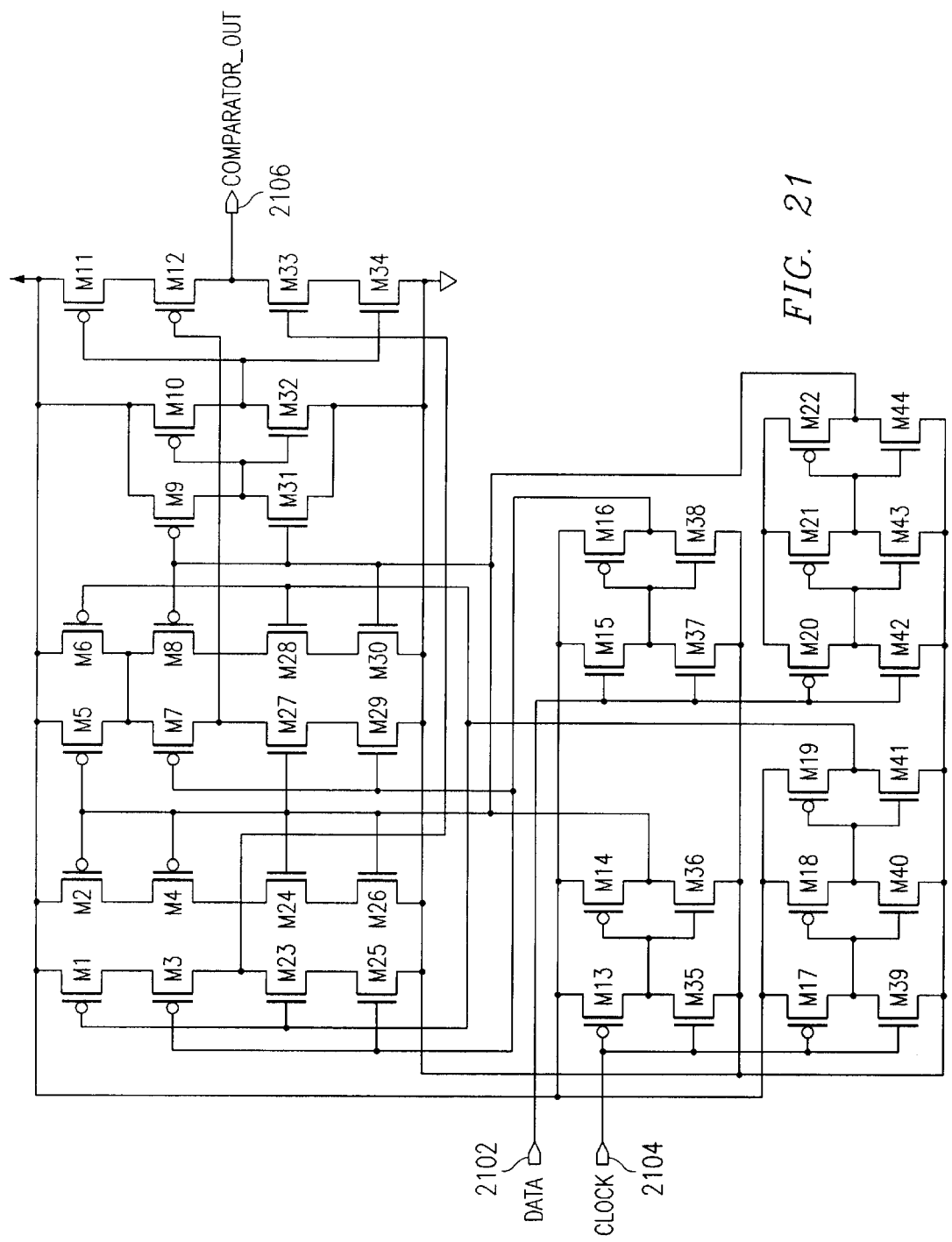
FIG. 21 is a schematic diagram depicting the comparator.

FIGS. 21 and 22 are schematic diagrams depicting a comparator and integrator as used in a phase locked loop for implementation in the present invention. The physical structure and components comprising these elements are well known in the art and therefore will not be discussed other than to note that the physical elements can be constructed from the aforementioned schematics.

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A system for stabilizing the impedance of a bus terminator comprising:
   a phase locked loop circuit having at least one phase locked loop control voltage; and
   a bus terminator, the bus terminator comprises voltage variable impedance circuitry, wherein the bus terminator is connected to the phase locked loop circuit and wherein the phase locked loop control voltage stabilizes the impedance of a bus terminator by controlling the voltage variable impedance circuitry.

2. The system for stabilizing the impedance of a bus terminator recited in claim 1, wherein the phase locked loop circuit comprises:
   a capacitor referenced voltage variable delay, wherein the capacitor referenced voltage variable delay uses the capacitor to reference the phase locked loop control voltage.

3. The system for stabilizing the impedance of a bus terminator recited in claim 2, wherein the initial value of a capacitor control voltage is read from memory.

4. The system for stabilizing the impedance of a bus terminator recited in claim 2, wherein the initial value of a capacitor control voltage is related to a clock period of the phase locked loop.

5. The system for stabilizing the impedance of a bus terminator recited in claim 2, wherein the phase locked loop control voltage controls a timing delay circuit in the phase locked loop circuit.

6. The system for stabilizing the impendance of a bus terminator recited in claim 2, wherein the initial value of a capacitor control voltage is controls a clock period of the phase locked loop.

7. A system for adjusting a variable impedance bus terminator comprising:

a signal generator, the signal generator generates a reference signal which is related a clock period; and a variable impedance terminator terminates a bus line input with a variable impedance and is connect to the signal generator, wherein the signal generator compares delayed data to un-delayed data to produce a reference signal for adjusting the impedance of the variable impendance terminator.

8. A system for adjusting a variable impedance bus terminator recited in claim 7, wherein the initial value of the reference signal is stored in memory.

9. A system for adjusting a variable impedance bus terminator recited in claim 7, wherein the signal generator is a phase locked loop.

10. A system for adjusting a variable impedance bus terminator recited in claim 9, wherein the phase locked loop further comprises:

a capacitor referenced voltage variable: delay, wherein the capacitor referenced voltage variable delay uses the capacitor to reference the phase locked loop control voltage.

11. The system for stabilizing the impedance of a bus terminator recited in claim 10, wherein the initial value of a capacitor control voltage is read from memory.

12. The system for stabilizing the impedance of a bus terminator recited in claim 10, wherein the phase locked loop control voltage controls a timing delay circuit in the phase locked loop circuit.

13. A system for adjusting a voltage variable impedance bus terminator comprising:

a voltage variable impedance terminator, wherein the bus terminator has a bus line input and a voltage input; a clock derivative signal;

a voltage variable delay clement, wherein the voltage variable delay element delays the clock derivative input, a voltage input, a digital control input and a delayed clock derivative output;

a comparator, wherein the comparator connected to the voltage variable delay element and the clock derivative output, having two inputs and an output, a clock input, delayed clock input from the voltage variable delay element and a comparison output; and an integrator connected to the comparator voltage variable delay element and the voltage variable impedance terminator, wherein the integrator converts the comparison output to a voltage for input to the voltage variable delay element and the voltage variable impedance terminator voltage variable delay element.

14. A system for adjusting a voltage variable impedance bus terminator comprising:

a digitally controlled voltage variable delay element, wherein the voltage variable delay element has three inputs and one output, a clock input, a voltage input, a control input and a delayed clock output;

a comparator, wherein the comparator connected to the voltage variable delay element, having two inputs and an output, a clock input, delayed clock input from the voltage variable delay element and a comparison output; and an integrator connected to the comparator, voltage variable delay element and the voltage variable impedance terminator, wherein the integrator converts the comparison output to a voltage for input to the voltage variable delay element and the voltage variable impedance terminator voltage variable delay element.

15. A method for stabilizing the impedance of a bus terminator comprising:

generating a phase locked loop control voltage in a phase locked loop circuit; and using the phase locked loop control voltage to control a voltage variable impedance circuitry, the voltage variable impedance circuitry being contained in a bus terminator, wherein the phase locked loop control voltage stabilizes the impedance of a bus terminator by controlling the voltage variable impedance circuitry.

16. The method for stabilizing the impedance of a terminator recited in claim 15, wherein the step of using the phase locked loop control voltage further comprises:

referencing a capacitor control voltage to a reference capacitor, wherein the reference capacitor is contained in capacitor referenced voltage variable delay.

17. The method for stabilizing the impedance of a bus terminator recited in claim 16 further comprises:

reading an initial capacitor control voltage value.

18. The method for stabilizing the impedance of a bus terminator recited in claim 16 further comprises:

controlling a clock delay with the capacitor control voltage.

19. The method for stabilizing the impedance of a bus terminator recited in claim 16 further comprises:

regulating a clock delay circuit with the phase locked loop control voltage.

20. A method for stabilizing the impedance of a bus terminator comprising:

generating a reference signal which is related a clock period wherein the reference signal is generated by comparing delayed data to un-delayed data; and adjusting the impedance of a variable impedance terminator using the reference signal, wherein the variable impedance terminator is adjusted for temperature.

21. The method for stabilizing the impedance of a bus terminator recited in claim 20 further comprising:

retrieving the initial value of the reference signal from memory.

22. The method for stabilizing the impedance of a bus terminator recited in claim 20, wherein the reference signal is generated by a phase locked loop.

23. The method for stabilizing the impedance of a bus terminator recited in claim 22, wherein the step of generating a reference signal further comprises:

applying the referencing a capacitor referenced voltage variable delay, wherein the capacitor referenced voltage variable delay uses the capacitor to reference the phase locked loop control voltage.

24. The method for stabilizing the impedance of a bus terminator recited in claim 23 further comprises:

reading the initial value of a capacitor control voltage from memory.

25. The method for stabilizing the impedance of a bus terminator recited in claim 23 further comprises:

controlling a timing delay circuit in the phase locked loop circuit.

* * * * *